(12) United States Patent
Okochi et al.

(10) Patent No.: US 12,519,112 B2
(45) Date of Patent: Jan. 6, 2026

(54) LDH-LIKE COMPOUND SEPARATOR AND ZINC SECONDARY BATTERY

(71) Applicant: NGK INSULATORS, LTD., Nagoya (JP)

(72) Inventors: Sota Okochi, Nishio (JP); Shohei Yokoyama, Nagoya (JP); Sho Yamamoto, Nagoya (JP); Naoko Inukai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 490 days.

(21) Appl. No.: 18/180,276

(22) Filed: Mar. 8, 2023

(65) Prior Publication Data

US 2023/0231154 A1    Jul. 20, 2023

Related U.S. Application Data

(63) Continuation of application No. PCT/JP2021/031344, filed on Aug. 26, 2021.

(30) Foreign Application Priority Data

Nov. 30, 2020   (JP) .................. 2020-198983

(51) Int. Cl.
```
H01M 8/0245    (2016.01)
H01M 8/083     (2016.01)
H01M 50/434    (2021.01)
H01M 50/451    (2021.01)
```
(Continued)

(52) U.S. Cl.
CPC ......... *H01M 8/0245* (2013.01); *H01M 8/083* (2013.01); *H01M 50/434* (2021.01); *H01M 50/451* (2021.01); *H01M 50/489* (2021.01); *H01M 50/491* (2021.01)

(58) Field of Classification Search
CPC .................................................. H01M 8/0245
See application file for complete search history.

(56) References Cited

U.S. PATENT DOCUMENTS

| | | | |
|---|---|---|---|
| 9,293,791 B2 | 3/2016 | Yamada et al. | |
| 10,290,847 B2 | 5/2019 | Kitoh et al. | |
| 11,158,906 B2 * | 10/2021 | Takeuchi | H01M 50/403 |

(Continued)

FOREIGN PATENT DOCUMENTS

| | | |
|---|---|---|
| WO | 2013/118561 A1 | 8/2013 |
| WO | 2016/067884 A1 | 5/2016 |

(Continued)

OTHER PUBLICATIONS

Chinese Office Action (with English translation) dated Jun. 20, 2025 (Application No. 202180062519.0).

(Continued)

*Primary Examiner* — Brian R Ohara
(74) *Attorney, Agent, or Firm* — BURR PATENT LAW, PLLC

(57) ABSTRACT

Provided is an LDH-like compound separator including a porous substrate made of a polymeric material; and a layered double hydroxide (LDH)-like compound with which pores of the porous substrate are plugged. A central region along the thickness of the LDH-like compound separator has a lower mean porosity than peripheral regions along the thickness of the LDH-like compound separator.

11 Claims, 13 Drawing Sheets

(51) Int. Cl.
  *H01M 50/489*   (2021.01)
  *H01M 50/491*   (2021.01)

(56) References Cited

U.S. PATENT DOCUMENTS

| | | |
|---|---|---|
| 11,211,672 B2 | 12/2021 | Yamamoto et al. |
| 11,431,034 B2 | 8/2022 | Yamamoto et al. |
| 2017/0214019 A1 | 7/2017 | Yokoyama et al. |

FOREIGN PATENT DOCUMENTS

| | | | | |
|---|---|---|---|---|
| WO | 2016/076047 A1 | 5/2016 | | |
| WO | WO-2019124214 A1 * | 6/2019 | .......... | H01M 50/403 |
| WO | 2020/121673 A1 | 6/2020 | | |
| WO | 2020/255856 A1 | 12/2020 | | |

OTHER PUBLICATIONS

Varga et al., "*Layered double alkoxides a novel group of layered double hyrdoxides without water content*," Materials Research Letters, 2020, vol. 8, No. 2, p. 68-74, https://doi.org/10.1080/21663831.2019.170119.

International Search Report and Written Opinion dated Oct. 19, 2021 (Application No. PCT/JP2021/031344).

\* cited by examiner

LDH-LIKE COMPOUND SEPARATOR AND ZINC SECONDARY BATTERY

CROSS-REFERENCE TO RELATED APPLICATIONS

This application is a continuation application of PCT/JP2021/031344 filed Aug. 26, 2021, which claims priority to Japanese Patent Application No. 2020-198983 filed Nov. 30, 2020, the entire contents all of which are incorporated herein by reference.

BACKGROUND OF THE INVENTION

1. Field of the Invention

The present invention relates to an LDH-like compound separator and a secondary zinc battery.

2. Description of the Related Art

In secondary zinc batteries, such as secondary nickel-zinc batteries and secondary air-zinc batteries, it is known that metallic zinc dendrites precipitate on negative electrodes during a charge mode, penetrate through voids in separators composed of, for example, non-woven fabrics, and reach positive electrodes, resulting in short circuit. The short circuit caused by such zinc dendrites occurs during repeated charge/discharge operations, leading to a reduction in service lives of the secondary zinc batteries.

In order to solve such a problem, secondary zinc batteries have been proposed that include layered double hydroxide (LDH) separators that selectively permeate hydroxide ions while blocking the penetration of zinc dendrites. For example, Patent Literature 1 (WO2013/118561) discloses a secondary nickel-zinc battery including an LDH separator disposed between a positive electrode and a negative electrode. Patent Literature 2 (WO2016/076047) discloses a separator structure including an LDH separator that is fit in or joined to a resin frame and is dense enough to restrict permeation of gas and/or water. Patent Literature 2 also discloses that the LDH separator may be a composite with a porous substrate. In addition, Patent Literature 3 (WO 2016/067884) discloses various methods for forming a dense LDH membrane on the surface of a porous substrate to give a composite material (an LDH separator). These methods include the steps of: uniformly bonding an initiating material capable of giving origins of crystal growth of LDH to the porous substrate; and then subjecting the porous substrate to hydrothermal treatment in an aqueous raw material solution to form a dense LDH membrane on the surface of the porous substrate.

In the meantime, Patent Literature 4 (WO2019/124214) discloses an LDH separator including a porous substrate made of a polymeric material; and a layered double hydroxide (LDH) with which pores of the porous substrate are plugged, in which a central region along the thickness of the LDH separator has a lower mean porosity than peripheral regions along the thickness of the LDH separator.

CITATION LIST

Patent Literature

Patent Literature 1: WO2013/118561
Patent Literature 2: WO2016/076047
Patent Literature 3: WO2016/067884
Patent Literature 4: WO2019/124214

SUMMARY OF THE INVENTION

In the case that secondary zinc batteries, for example, nickel-zinc batteries, are constructed with an LDH separator as described above, the problem such as short circuit caused by zinc dendrites can be effectively prevented to some extent. However, a further improvement is desired for a preventive effect of the short circuit caused by the dendrites.

The inventors have now found that by using an LDH-like compound described hereinafter as a hydroxide ion-conductive substance instead of conventional LDHs, it is possible to provide a hydroxide ion-conductive separator (LDH-like compound separator) having excellent alkali resistance and capable of suppressing short circuits due to zinc dendrites further effectively. The inventors have also found that by plugging pores of a porous polymeric substrate with an LDH-like compound such that a central region along the thickness of the substrate has a lower mean porosity than peripheral regions along the thickness of the substrate, it is possible to provide an LDH-like compound separator that can more effectively prevent short circuiting caused by zinc dendrites.

Accordingly, an object of the present invention is to provide a hydroxide ion-conductive separator having excellent alkali resistance and capable of suppressing short circuits due to zinc dendrites further effectively, which is superior to the LDH separator.

According to an embodiment of the present invention, there is provided an LDH-like compound separator comprising a porous substrate made of a polymeric material; and a layered double hydroxide (LDH)-like compound with which pores of the porous substrate are plugged, wherein a central region along the thickness of the LDH-like compound separator has a lower mean porosity than peripheral regions along the thickness of the LDH-like compound separator.

According to another embodiment of the present invention, there is provided a secondary zinc battery comprising the LDH-like compound separator.

According to another embodiment of the present invention, there is provided a solid-state alkaline fuel cell comprising the LDH-like compound separator.

DETAILED DESCRIPTION OF THE INVENTION

LDH-Like Compound Separator

Figure 1:
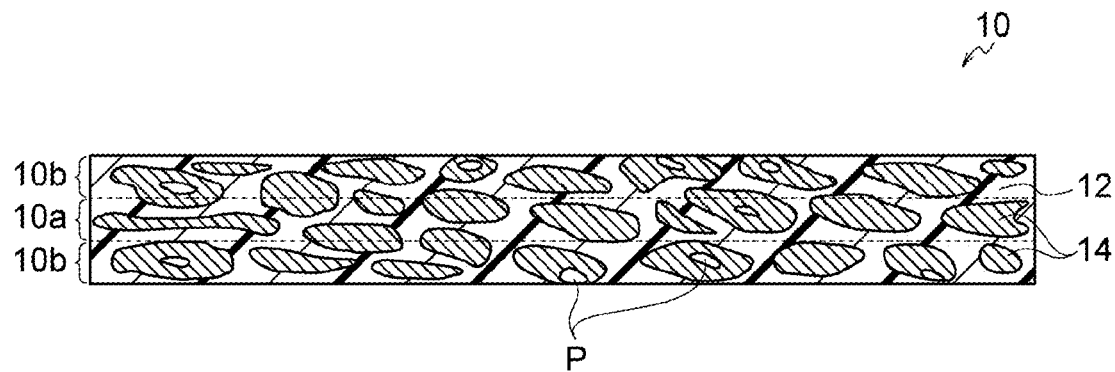
FIG. 1 is a conceptual schematic cross-sectional view illustrating an LDH-like compound separator of the present invention.

As illustrated in a schematic cross-sectional view in FIG. 1, an LDH-like compound separator 10 of the present invention includes a porous substrate 12 and a layered double hydroxide (LDH)-like compound 14. The "LDH-like compound separator" is defined herein as a separator including an LDH-like compound and configured to selectively pass hydroxide ions exclusively by means of the hydroxide ion conductivity of the LDH-like compound. The "LDH-like compound" is defined herein as a hydroxide and/or an oxide having a layered crystal structure that cannot be called LDH but is analogous to LDH, for which no peak attributable to LDH is detected in X-ray diffraction method. Although individual regions of the LDH-like compound 14 are seemed to be discontinuous between the top face and bottom face of the LDH-like compound separator 10 in a two-dimensional cross-section of the LDH-like compound separator in FIG. 1, the regions of the LDH-like compound 14 are continuous in the three-dimensional geometry including the depth between the top face and bottom face of the LDH-like compound separator 10, which ensures the hydroxide ion conductivity of the LDH-like compound separator 10. The porous substrate 12 is made of a polymeric material. Pores of the porous substrate 12 are plugged with the LDH-like compound 14. In this regard, the pores of the porous substrate 12 are not completely plugged with the LDH-like compound 14 and pores P that are not plugged with the LDH-like compound remain. From the viewpoint of such remaining pores P, the LDH-like compound separator 10 can be evaluated by a mean porosity. A central region 10a along the thickness of the LDH-like compound separator 10 has a lower mean porosity than peripheral regions 10b along the thickness of the LDH-like compound separator 10. In other words, the LDH-like compound separator 10 of the present invention has an uneven distribution of remaining pores P along the thickness. In detail, the central region 10a have high denseness whereas the peripheral regions 10b have low denseness. In this way, the pores of the porous polymeric substrate 12 are plugged with the LDH-like compound 14 such that the central region 10a along the thickness of the porous substrate 12 has a lower mean porosity than the peripheral regions 10b along the thickness of the porous substrate 12. The LDH-like compound separator 10 can be thereby provided that can more effectively prevent short circuiting caused by zinc dendrites. In a traditional separator, penetration of zinc dendrites is assumed to occur by the following mechanism: (i) Zinc dendrites intrude into voids or defects contained in the separator; (ii) the dendrites grow or propagate while expanding the voids or defects in the separator; and (iii) the dendrites finally penetrate the separator.

In contrast, the LDH-like compound separator 10 of the present invention has the central region 10a with high denseness and the peripheral regions 10b with low denseness. Thus, the peripheral regions 10b having a higher mean porosity than the central region 10a can serve as buffer layers against the intrusion of the zinc dendrites and hold back the growth and propagation of the dendrites. As a result, the propagation of the zinc dendrites along the thickness of the LDH-like compound separator 10 (in particular, the penetration of the zinc dendrites through the central region 10a) can be significantly blocked. Thus, the short circuiting caused by the zinc dendrites can be more effectively prevented. In particular, by using an LDH-like compound described hereinafter as a hydroxide ion-conductive substance instead of conventional LDHs, it is possible to provide a hydroxide ion-conductive separator (LDH-like compound separator) having excellent alkali resistance and capable of suppressing short circuits due to zinc dendrites further effectively.

The LDH-like compound separator 10 of the present invention has excellent flexibility and strength, as well as a desired ion conductivity based on the hydroxide ion conductivity of the LDH-like compound 14. The flexibility and strength are caused by those of the porous polymeric substrate 12 itself of the LDH-like compound separator 10. In other words, the LDH separator 10 is densified in such a manner that the pores of the porous polymeric substrate 12 are sufficiently plugged with the LDH-like compound 14, and the porous polymeric substrate 12 and the LDH-like compound 14 are highly integrated into a superior composite material, thereby high rigidity and low ductility caused by the LDH-like compound 14, which is ceramic material, can be balanced with or reduced by high flexibility and high strength of the porous polymeric substrate 12.

As described above, the central region 10a along the thickness of the LDH-like compound separator 10 has a lower mean porosity than the peripheral regions 10b along the thickness of the LDH-like compound separator 10. In this specification, the central region 10a refers to the portion located in the center when the LDH-like compound separator 10 is divided into three equal portions in the direction of thickness, and the peripheral regions 10b refer to the portions close to the faces (i.e., the portions outside the central region 10a) when the LDH-like compound separator 10 is divided into three equal portions in the direction of thickness. It is preferred that the peripheral regions 10b have a mean porosity of 3% or more and that the central region 10a has a mean porosity of 2% or less. It is more preferred that the peripheral regions 10b have a mean porosity of 3 to 15% and that the central region 10a has a mean porosity of 1% or less. It is further preferred that the peripheral regions 10b have a mean porosity of 5 to 10% and that the central region 10a has a mean porosity of 0.01 to 1%. The central region 10a and the peripheral regions 10b having mean porosities in such ranges can more properly hold back the growth of the zinc dendrites in the peripheral regions 10b, Thus, the short circuiting caused by the zinc dendrites can be more effectively prevented. A significantly high ion conductivity of the LDH-like compound separator 10 can be also achieved. Thus, the LDH-like compound separator 10 can properly conduct hydroxide ions. The mean porosity can be determined by a) polishing a cross-sectional face of the LDH-like compound separator with a cross-sectional polisher (CP), b) capturing two fields of images of a functional layer at a magnification of 50,000 folds with a field-emission scanning electron microscope (FE-SEM), c) calculating porosities of the two fields with image inspection software (for example, HDevelop available from MVTec Software) based on the data of the captured cross-sectional images, and d) averaging the calculated porosities.

The LDH-like compound separator 10 has an ionic conductivity of preferably 0.1 mS/cm or more, more preferably 1.0 mS/cm or more, further preferably 1.5 mS/cm or more, particularly preferably 2.0 mS/cm or more. Such a range allows the LDH-like compound separator to fully function as a separator having hydroxide ionic conductivity. Since a higher ionic conductivity is preferred, the LDH-like compound separator may have any upper limit of ionic conductivity, for example, 10 mS/cm. The ionic conductivity is calculated from the resistance, the thickness and the area of the LDH-like compound separator. The resistance of the LDH-like compound separator 10 is measured within a frequency range of 1 MHz to 0.1 Hz and under an applied voltage of 10 mV using an electrochemical measurement system (potentio-galvanostat frequency responsive analyzer) for the LDH-like compound separator 10 immersed in an aqueous KOH solution of a predetermined concentration (for example, 5.4 M), and the intercept across the real axis can be determined to be the resistance of the LDH-like compound separator.

The LDH-like compound separator 10 includes a layered double hydroxide (LDH)-like compound 14, and can isolate a positive electrode plate from a negative electrode plate and ensures hydroxide ionic conductivity therebetween in a secondary zinc battery. The LDH-like compound separator 10 functions as a hydroxide ionic conductive separator. Preferred LDH-like compound separator 10 has gas-impermeability and/or water-impermeability. In other words, the LDH-like compound separator 10 is preferably densified to an extent that exhibits gas-impermeability and/or water-impermeability. The phrase "having gas-impermeability" throughout the specification indicates that no bubbling of helium gas is observed at one side of a sample when helium gas is brought into contact with the other side in water at a differential pressure of 0.5 atm as described in Patent Literatures 2 and 3. In addition, the phrase "having water-impermeability" throughout the specification indicates that water in contact with one side of the sample does not permeate to the other side as described in Patent Literatures 2 and 3. As a result, the LDH-like compound separator 10 having gas-impermeability and/or water-impermeability indicates having high density to an extent that no gas or no water permeates, and not being a porous membrane or any other porous material that has gas-permeability or water-permeability. Accordingly, the LDH-like compound separator 10 can selectively permeate only hydroxide ions due to its hydroxide ionic conductivity, and can serve as a battery separator. The LDH-like compound separator 10 thereby has a physical configuration that prevents penetration of zinc dendrites generated during a charge mode through the separator, resulting in prevention of short circuit between positive and negative electrodes. Since the LDH-like compound separator 10 has hydroxide ionic conductivity, the ionic conductivity allows a necessary amount of hydroxide ions to efficiently move between the positive electrode plate and the negative electrode plate, and thereby charge/discharge reaction can be achieved on the positive electrode plate and the negative electrode plate.

The LDH-like compound separator 10 preferably has a helium permeability per unit area of 3.0 cm/min·atm or less, more preferably 2.0 cm/min·atm or less, further preferably 1.0 cm/min·atm or less. A separator having a helium permeability of 3.0 cm/min·atm or less can remarkably restrain the permeation of Zn (typically, the permeation of zinc ions or zincate ions) in the electrolytic solution. Thus, it is conceivable in principle that the separator of the present embodiment can effectively restrain the growth of zinc dendrites when used in secondary zinc batteries because Zn permeation is significantly suppressed. The helium permeability is measured through the steps of: supplying helium gas to one side of the separator to allow the helium gas to permeate into the separator; and calculating the helium permeability to evaluate the density of the hydroxide ion conductive separator. The helium permeability is calculated from the expression of $F/(P \times S)$ where F is the volume of permeated helium gas per unit time, P is the differential pressure applied to the separator when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the separator has sufficiently high density suitable for separators of secondary zinc batteries can be evaluated readily, safely and effectively. The helium permeability can be preferably measured in accordance with the procedure shown in Evaluation 5 in the Examples described later.

In the LDH-like compound separator 10, the pores in the porous substrate 12 are filled with the LDH-like compound 14. Preferably, the LDH-like compound is:
(a) a hydroxide and/or an oxide with a layered crystal structure, containing: Mg; and one or more elements, which include at least Ti, selected from the group consisting of Ti, Y, and Al, or
(b) a hydroxide and/or an oxide with a layered crystal structure, comprising (i) Ti, Y, and optionally Al and/or Mg, and (ii) at least one additive element M selected from the group consisting of In, Bi, Ca, Sr, and Ba, or
(c) a hydroxide and/or an oxide with a layered crystal structure, comprising Mg, Ti, Y, and optionally Al and/or In, wherein in (c) the LDH-like compound is present in a form of a mixture with $In(OH)_3$.

According to a preferred embodiment (a) of the present invention, the LDH-like compound 14 is a hydroxide and/or an oxide with a layered crystal structure containing: Mg; and one or more elements, which include at least Ti, selected from the group consisting of Ti, Y, and Al. Accordingly, the LDH-like compound 14 is typically a composite hydroxide and/or a composite oxide of Mg, Ti, optionally Y, and optionally Al. The aforementioned elements may be replaced with other elements or ions to the extent that the basic properties of the LDH-like compound 14 are not impaired, but the LDH-like compound 14 is preferably free from Ni. For example, the LDH-like compound 14 may further contain Zn and/or K. This can further improve the ion conductivity of the LDH-like compound separator 10.

The LDH-like compound 14 can be identified by X-ray diffraction. Specifically, the LDH-like compound separator 10 has a peak that is derived from the LDH-like compound and detected in the range of typically $5°≤2θ≤10°$, more typically $7°≤2θ≤10°$, when X-ray diffraction is performed on its surface. As described above, an LDH is a substance having an alternating laminated structure in which exchangeable anions and $H_2O$ are present as an interlayer between stacked basic hydroxide layers. In this regard, when the LDH is measured by X-ray diffraction, a peak due to the crystal structure of the LDH (that is, the (003) peak of LDH) is originally detected at a position of $2θ=11°$ to $12°$. In contrast, when the LDH-like compound 14 is measured by X-ray diffraction, a peak is typically detected in such a range shifted toward the low angle side from the peak position of the LDH. Further, the interlayer distance in the layered crystal structure can be determined by Bragg's equation using $2θ$ corresponding to peaks derived from the LDH-like compound in X-ray diffraction. The interlayer distance in the layered crystal structure constituting the LDH-like compound 14 thus determined is typically 0.883 to 1.8 nm, more typically 0.883 to 1.3 nm.

The LDH-like compound separator 10 according to the above embodiment (a) preferably has an atomic ratio Mg/(Mg+Ti+Y+Al) in the LDH-like compound 14, as determined by energy dispersive X-ray spectroscopy (EDS), of 0.03 to 0.25, more preferably 0.05 to 0.2. Further, an atomic ratio Ti/(Mg+Ti+Y+Al) in the LDH-like compound 14 is preferably 0.40 to 0.97, more preferably 0.47 to 0.94. Further, an atomic ratio Y/(Mg+Ti+Y+Al) in the LDH-like compound 14 is preferably 0 to 0.45, more preferably 0 to 0.37. Further, an atomic ratio Al/(Mg+Ti+Y+Al) in the LDH-like compound 14 is preferably 0 to 0.05, more preferably 0 to 0.03. Within such a range, the alkali resistance is further excellent, and the effect of suppressing short circuits due to zinc dendrites (that is, dendrite resistance) can be achieved more effectively. Meanwhile, LDHs conventionally known for LDH separators can be expressed by a basic composition represented by the formula: $M^{2+}_{1-x}M^{3+}_{x}(OH)_2A^{n-}_{x/n}·mH_2O$ (in the formula, $M^{2+}$ is a divalent cation, $M^{3+}$ is a trivalent cation, $A^{n-}$ is an n-valent anion, n is an integer of 1 or more, x is 0.1 to 0.4, and m is 0 or more). In contrast, the aforementioned atomic ratios in the LDH-like compound 14 generally deviate from those in the aforementioned formula of LDH. Therefore, it can be said that the LDH-like compound 14 in the present embodiment generally has composition ratios (atomic ratios) different from those of such a conventional LDH. The EDS analysis is preferably performed by 1) capturing an image at an acceleration voltage of 20 kV and a magnification of 5,000 times, 2) performing analysis at three points at intervals of about 5 μm in the point analysis mode, 3) repeating procedures 1) and 2) above once again, and 4) calculating an average of the six points in total, using an EDS analyzer (for example, X-act, manufactured by Oxford Instruments).

According to another embodiment (b), the LDH-like compound 14 may be a hydroxide and/or an oxide with a layered crystal structure containing (i) Ti, Y, and optionally Al and/or Mg, and (ii) an additive element M. Therefore, the LDH-like compound 14 is typically a complex hydroxide and/or a complex oxide with Ti, Y, the additive element M, and optionally Al and optionally Mg. The additive element M is In, Bi, Ca, Sr, Ba, or combinations thereof. The elements described above may be replaced by other elements or ions to the extent that the basic properties of the LDH-like compound 14 are not impaired, and the LDH-like compound 14 is preferably free of Ni.

The LDH-like compound separator 10 according to the above embodiment (b) preferably has an atomic ratio of Ti/(Mg+Al+Ti+Y+M) of 0.50 to 0.85 in the LDH-like compound 14, as determined by energy dispersive X-ray spectroscopy (EDS) and more preferably has the atomic ratio of 0.56 to 0.81. An atomic ratio of Y/(Mg+Al+Ti+Y+M) in the LDH-like compound 14 is preferably 0.03 to 0.20 and more preferably 0.07 to 0.15. An atomic ratio of M/(Mg+Al+Ti+Y+M) in the LDH-like compound 14 is preferably 0.03 to 0.35 and more preferably 0.03 and 0.32. An atomic ratio of Mg/(Mg+Al+Ti+Y+M) in the LDH-like compound is preferably 0 to 0.10 and more preferably 0 to 0.02. In addition, an atomic ratio of Al/(Mg+Al+Ti+Y+M) in the LDH-like compound 14 is preferably 0 to 0.05 and more preferably 0 to 0.04. The ratios within the above ranges enable to achieve more excellent alkali resistance and a short-circuit inhibition effect caused by zinc dendrite (i.e., dendrite resistance) in more efficient manner. By the way, an LDH that is conventionally known with respect to an LDH separator, can be represented by the basic composition of the formula: $M^{2+}_{1-x}M^{3+}_{x}(OH)_2A^{n-}_{x/n}·mH_2O$ wherein $M^{2+}$ is a divalent cation, $M^{3+}$ is a trivalent cation, $A^{n-}$ is an n-valent anion, n is an integer of 1 or greater, x is 0.1 to 0.4, and m is an integer of to 0 or greater. In contrast, the above atomic ratio in the LDH-like compound 14 generally deviates from that of the above formula of LDH. Therefore, the LDH-like compound 14 in the present embodiment can be generally said to have a composition ratio (atomic ratio) different from that of conventional LDH. The EDS analysis is preferably carried out with an EDS analyzer (for example, X-act manufactured by Oxford Instruments) by 1) capturing an image at an accelerating voltage of 20 kV and a magnification of 5,000 times, 2) carrying out a three-point analysis at about 5 μm intervals in a point analysis mode, 3) repeating the above 1) and 2) once more, and 4) calculating an average value of a total of 6 points.

According to yet another embodiment (c), the LDH-like compound 14 may be a hydroxide and/or an oxide with a layered crystal structure, comprising Mg, Ti, Y, and optionally Al and/or In, in which the LDH-like compound 14 is present in a form of a mixture with $In(OH)_3$. The LDH-like compound of the present embodiment is a hydroxide and/or an oxide with a layered crystal structure containing Mg, Ti, Y, and optionally Al and/or In. Therefore, the typical LDH-like compound is a complex hydroxide and/or a complex oxide with Mg, Ti, Y, optionally Al, and optionally In. Here, In that can be contained in the LDH-like compound may be not only one intentionally added, but also one unavoidably incorporated in the LDH-like compound derived from formation of $In(OH)_3$ or the like. The elements described above may be replaced by other elements or ions to the extent that the basic properties of the LDH-like compound are not impaired, and the LDH-like compound is preferably free of Ni. By the way, an LDH that is conventionally known with respect to an LDH separator, can be represented by the basic composition of the formula: $M^{2+}_{1-x}M^{3+}_{x}(OH)_2A^{n-}_{x/n} \cdot mH_2O$ wherein $M^{2+}$ is a divalent cation, $M^{3+}$ is a trivalent cation, $A^{n-}$ is an n-valent anion, n is an integer of 1 or greater, x is 0.1 to 0.4, and m is 0 or greater. In contrast, the atomic ratio in the LDH-like compound generally deviates from that of the above formula of LDH. Therefore, the LDH-like compound in the present embodiment can be generally said to have a composition ratio (atomic ratio) different from that of conventional LDH.

The mixture according to the above embodiment (c) contains not only the LDH-like compound but also $In(OH)_3$ (typically composed of the LDH-like compound and $In(OH)_3$). $In(OH)_3$ contained effectively improves alkali resistance and dendrite resistance in the LDH-like compound separator 10. The content ratio of $In(OH)_3$ in the mixture is preferably an amount that can improve the alkali resistance and dendrite resistance without impairing hydroxide-ion conductivity of the LDH-like compound separator 10 and is not limited to any particular amount. $In(OH)_3$ may have a cubic crystal structure and may be in a configuration where the crystals thereof are surrounded by the LDH-like compounds. The $In(OH)_3$ can be identified by X-ray diffraction; and X-ray diffraction measurement is preferably conducted according to the procedure described in the Example below.

As described above, the LDH-like compound separator 10 comprises the LDH-like compound 14 and the porous substrate 12 (typically consists of the porous substrate 12 and the LDH-like compound 14), and the LDH-like compound 14 plugs the pores in the porous substrate 12 such that the LDH-like compound separator 10 exhibits hydroxide ionic conductivity and gas-impermeability (thus, so as to serve as an LDH separator exhibiting hydroxide ionic conductivity). In particular, the LDH-like compound 14 is preferably incorporated over the entire thickness of the porous substrate 12 composed of a polymeric material. The LDH-like compound separator has a thickness of preferably 3 to 80 μm, more preferably 3 to 60 μm, further preferably 3 to 40 μm.

The porous substrate 12 is composed of a polymeric material. The polymeric porous substrate 12 has the following advantages; (1) high flexibility (hard to crack even if thinned), (2) high porosity, (3) high conductivity (small thickness with high porosity), and (4) good manufacturability and handling ability. The polymeric porous substrate has a further advantage; (5) readily folding and sealing the LDH-like compound separator including the porous substrate composed of the polymeric material based on the advantage (1): high flexibility. Preferred examples of the polymeric material include polystyrene, poly(ether sulfone), polypropylene, epoxy resin, poly(phenylene sulfide), fluorocarbon resin (tetra-fluorinated resin such as PTFE), cellulose, nylon, polyethylene and any combination thereof. More preferred examples include polystyrene, poly(ether sulfone), polypropylene, epoxy resin, poly(phenylene sulfide), fluorocarbon resin (tetra-fluorinated resin such as PTFE), nylon, polyethylene and any combination thereof from the viewpoint of a thermoplastic resin suitable for hot pressing. All the various preferred materials described above have alkali resistance to be resistant to the electrolytic solution of batteries. More preferred polymeric materials are polyolefins, such as polypropylene and polyethylene, most preferred are polypropylene and polyethylene from the viewpoint of excellent hot-water resistance, acid resistance and alkali resistance, and low material cost. In case that the porous substrate is composed of the polymeric material, the LDH-like compound is particularly preferably embedded over the entire thickness of the porous substrate (for example, most pores or substantially all pores inside the porous substrate are filled with the LDH-like compound). A polymeric microporous membrane commercially available can be preferably used as such a polymeric porous substrate.

Production Method

The method for producing the LDH-like compound separator 10 is not specifically limited, and the LDH-like compound separator can be produced by appropriately changing various conditions (particularly, the composition of LDH raw materials) in the already known methods (for example, see Patent Literatures 1 to 4) for producing an LDH-containing function layer and a composite material. For example, an LDH-like compound-containing function layer and a composite material (that is, an LDH-like compound separator) can be produced by (1) preparing a porous substrate, (2) applying a solution containing titania sol (or further containing yttrium sol and/or alumina sol) to the porous substrate, followed by drying, to form a titania-containing layer, (3) immersing the porous substrate in a raw material aqueous solution containing magnesium ions ($Mg^{2+}$) and urea (or further containing yttrium ions ($Y^{3+}$)), and (4) hydrothermally treating the porous substrate in the raw material aqueous solution, to form an LDH-like compound-containing function layer on the porous substrate and/or in the porous substrate. It is considered that the presence of urea in step (3) above generates ammonia in the solution through hydrolysis of urea, to increase the pH value, and coexisting metal ions form a hydroxide and/or an oxide, so that the LDH-like compound can be obtained.

In particular, in the case of producing a composite material (that is, an LDH-like compound separator) in which the porous substrate 12 is composed of a polymer material, and the LDH-like compound 14 is incorporated over the entire thickness direction of the porous substrate, the mixed sol solution is preferably applied to the substrate in step (2) above by a technique that allows the mixed sol solution to penetrate all or most of the inside of the substrate. This allows most or almost all the pores inside the porous substrate to be finally filled with the LDH-like compound. Preferable examples of the application technique include dip coating and filtration coating, particularly preferably dip coating. Adjusting the number of applications such as dip coating enables adjustment of the amount of the mixed sol solution to be applied. The substrate coated with the mixed sol solution by dip coating or the like may be dried and then subjected to steps (3) and (4) above.

When the porous substrate 12 is composed of a polymer material, an LDH-like compound separator obtained by the aforementioned method or the like is preferably pressed.

This enables an LDH-like compound separator with further excellent denseness to be obtained. The pressing technique is not specifically limited and may be, for example, roll pressing, uniaxial compression press, CIP (cold isotropic pressing) or the like but is preferably roll pressing. This pressing is preferably performed under heating, since the porous polymer substrate is softened, so that the pores of the porous substrate can be sufficiently filled with the LDH-like compound. For sufficient softening, the heating temperature is preferably 60 to 200° C., for example, in the case of polypropylene or polyethylene. The pressing such as roll pressing within such a temperature range can considerably reduce residual pores in the LDH-like compound separator. As a result, the LDH-like compound separator can be extremely densified, and short circuits due to zinc dendrites can be thus suppressed further effectively. Appropriately adjusting the roll gap and the roll temperature in roll pressing enables the morphology of residual pores to be controlled, thereby enabling an LDH-like compound separator with desired denseness to be obtained.

Secondary Zinc Batteries

The LDH-like compound separator of the present invention is preferably applied to secondary zinc batteries. According to a preferred embodiment of the present invention, a secondary zinc battery comprising the LDH-like compound separator are provided. A typical secondary zinc battery includes a positive electrode, a negative electrode, and an electrolytic solution, and isolates the positive electrode from the negative electrode with the LDH-like compound separator therebetween. The secondary zinc battery of the present invention may be of any type that includes a zinc negative electrode and an electrolytic solution (typically, an aqueous alkali metal hydroxide solution). Accordingly, examples of the secondary zinc battery include secondary nickel-zinc batteries, secondary silver oxide-zinc batteries, secondary manganese oxide-zinc batteries, secondary zinc-air batteries, and various other secondary alkaline zinc batteries. For example, the secondary zinc battery may preferably be a secondary nickel-zinc battery, the positive electrode of which contains nickel hydroxide and/or nickel oxyhydroxide. Alternatively, the secondary zinc battery may be a secondary zinc-air battery, the positive electrode of which is an air electrode.

Solid-State Alkaline Fuel Cells

The LDH-like compound separator of the present invention can be applied to a solid-state alkaline fuel cell. The use of the LDH-like compound separator that includes the porous polymeric substrate having the pores plugged with the LDH-like compound such that the central region along the thickness of the substrate has a lower mean porosity than the peripheral regions along the thickness of the substrate, it is possible to provide a solid-state alkaline fuel cell that can effectively prevent a reduction in electromotive force caused by permeation of a fuel (for example, by cross-over of methanol) into an air electrode: The hydroxide ion conductivity of the LDH-like compound separator can effectively prevent permeation of a fuel, for example, methanol through the LDH-like compound separator. Thus, another preferred embodiment of the present invention provides a solid-state alkaline fuel cell including the LDH-like compound separator. A typical solid-state alkaline fuel cell includes an air electrode receiving oxygen, a fuel electrode receiving a liquid fuel and/or a gaseous fuel, and the LDH-like compound separator interposed between the fuel electrode and the air electrode.

Other Batteries

The LDH-like compound separator of the present invention can be used not only in nickel-zinc batteries or solid-state alkaline fuel cells but also in, for example, nickel-hydrogen batteries. In this case, the LDH-like compound separator serves to block a nitride shuttle (movement of nitrate groups between electrodes), which is a factor of the self-discharging in the battery. The LDH-like compound separator of the present invention can also be applied in, for example, lithium batteries (batteries having a negative electrode composed of lithium metal), lithium ion batteries (batteries having a negative electrode composed of, for example, carbon), or lithium-air batteries.

EXAMPLES

The invention will be further described in more detail by the following Examples.

Examples A1 to A6

Examples A1 to A6 shown below are reference examples or comparative examples for LDH separators, but the experimental procedures and results in these examples are generally applicable to LDH-like compound separators as well. The following procedures were used to evaluate the LDH separator produced in these Examples.

Evaluation 1: Identification of LDH Separator

The crystalline phase of the LDH separator was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO. 35-0964.

Evaluation 2: Measurement of Thickness

The thickness of each LDH separator was measured with a micrometer. The thickness was measured at three points on the LDH separator. The mean value was calculated from these measurements and defined as the thickness of the LDH separator.

Evaluation 3: Measurement of Mean Porosity

A cross-sectional face of each LDH separator was polished with a cross-sectional polisher (CP). Two fields of images of the cross-sectional face of the LDH separator were captured at a magnification of 50,000 folds with a FE-SEM (ULTRA55 available from Carl Zeiss). Based on the image data, the porosities of the two fields were calculated with image inspection software (HDevelop available from MVTec Software). The average of the porosities was defined as the mean porosity. The mean porosity was determined at the peripheral regions of the LDH separator (the regions at a depth of 1 to 4 μm from the faces of the LDH separator) and the central region of the LDH separator.

Evaluation 4: Continuous Charge Test

Figure 2:
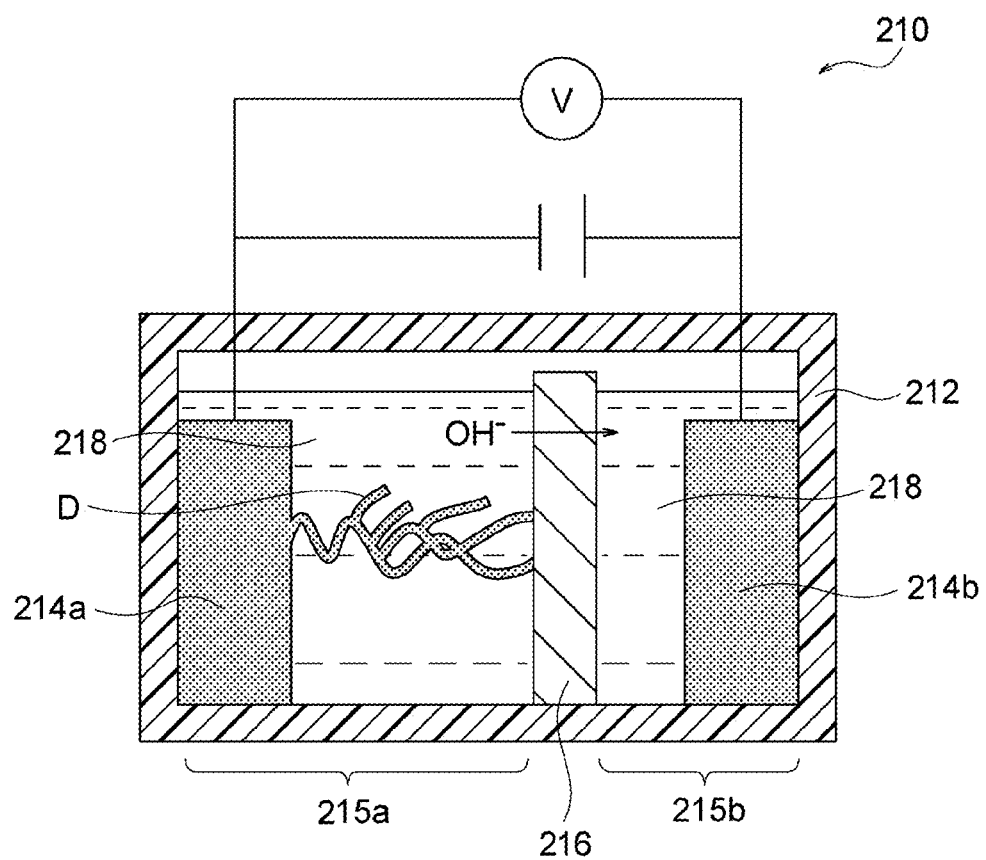
FIG. 2 is a schematic cross-sectional view of a measurement device used in the dendrite short-circuiting test in Examples A1 to A4.

A device 210 was assembled as shown in FIG. 2 and an accelerated test was carried out to continuously grow zinc dendrites. Specifically, a rectangular container 212 made of ABS resin was prepared, in which a zinc electrode 214a is separated by 0.5 cm from a copper electrode 214b to face each other. The zinc electrode 214a is a metal zinc plate, and the copper electrode 214b is a metal copper plate. In addition, an LDH separator structure including the LDH separator 216 was constructed, such that an epoxy resin-based adhesive was applied along the outer periphery of the LDH separator, and the LDH separator was bonded to a jig made of ABS resin having an opening at the center. At this time, the bonded area between the jig and the LDH separator was sufficiently sealed with the adhesive to ensure liquid-tightness. The LDH separator structure was then disposed in the container 212 to isolate a first section 215a including the zinc electrode 214a from a second section 215b including the copper electrode 214b, inhibiting liquid communication other than the area of the LDH separator 216. In this configuration, three outer edges of the LDH separator structure (or three outer edges of the jig made of ABS resin) were bonded to the inner wall of the container 212 with an epoxy resin adhesive to ensure liquid-tightness. In other words, the bonded area between the separator structure including the LDH separator 216 and the container 212 was sealed to inhibit the liquid communication. 5.4 mol/L aqueous KOH solution as an aqueous alkaline solution 218 was poured into the first section 215a and the second section 215b along with ZnO powders equivalent to saturated solubility. The zinc electrode 214a and the copper electrode 214b were connected to a negative terminal and a positive terminal of the constant-current power supply, respectively, and a voltmeter was also connected in parallel with the constant-current power supply. The liquid level of the aqueous alkaline solution 218 was determined below the height of the LDH separator structure (including the jig) such that the entire area of the LDH separator 216 in both the first section 215a and the second section 215b was immersed in the aqueous alkaline solution 218. In the measurement device 210 having such a configuration, a constant current of 20 mA/cm$^2$ was continuously applied between the zinc electrode 214a and the copper electrode 214b for up to 200 hours. During application of the constant current, the voltage between the zinc electrode 214a and the copper electrode 214b was monitored with a voltmeter to check for short circuit caused by zinc dendrites (a sharp voltage drop) between the zinc electrode 214a and the copper electrode 214b. No short circuit for over 100 hours (or over 200 hours) was determined as "(short circuit) not found", and short circuit within less than 100 hours (or less than 200 hours) was determined as "(short circuit) found".

Evaluation 5: Helium Permeability

Figure 3A:
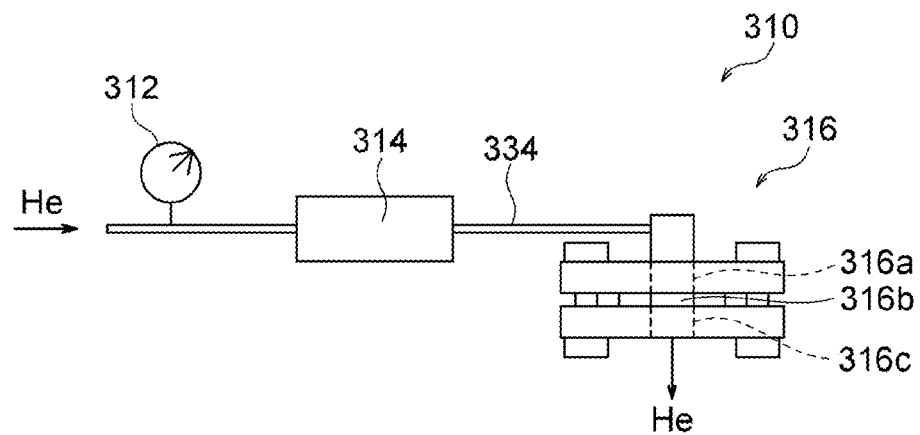
FIG. 3A is a conceptual view illustrating an example system for measuring helium permeability used in Examples A1 to D2.
Figure 3B:
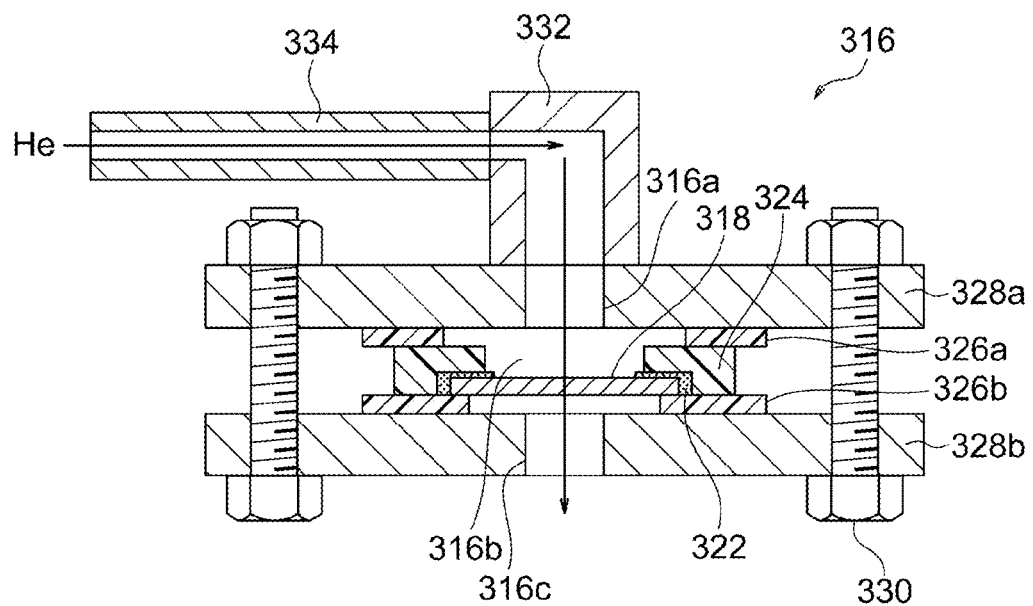
FIG. 3B is a schematic cross-sectional view of a sample holder and its peripheral configuration used in the measurement system shown in FIG. 3A.

A helium permeation test was conducted to evaluate the density of the LDH separator from the viewpoint of helium pereability. The helium permeability measurement system 310 shown in FIGS. 3A and 3B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of the LDH separator 318 held by the sample holder 316.

The sample holder 316 had a structure including a gas supply port 316a, a sealed space 316b and a gas discharge port 316c, and was assembled as follows: An adhesive 322 was applied along the outer periphery of the LDH separator 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the LDH separator 318, the jig 324, the sealing member 326a, and the supporting member 328a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the LDH separator 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of $F/(P \times S)$ where F (cm$^3$/min) was the volume of permeated helium gas per unit time, P (atm) was the differential pressure applied to the LDH separator when helium gas permeated through, and S (cm$^2$) was the area of the membrane through which helium gas permeates. The permeation rate F (cm$^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm.

Evaluation 6: Measurement of Ionic Conductivity

Figure 4:
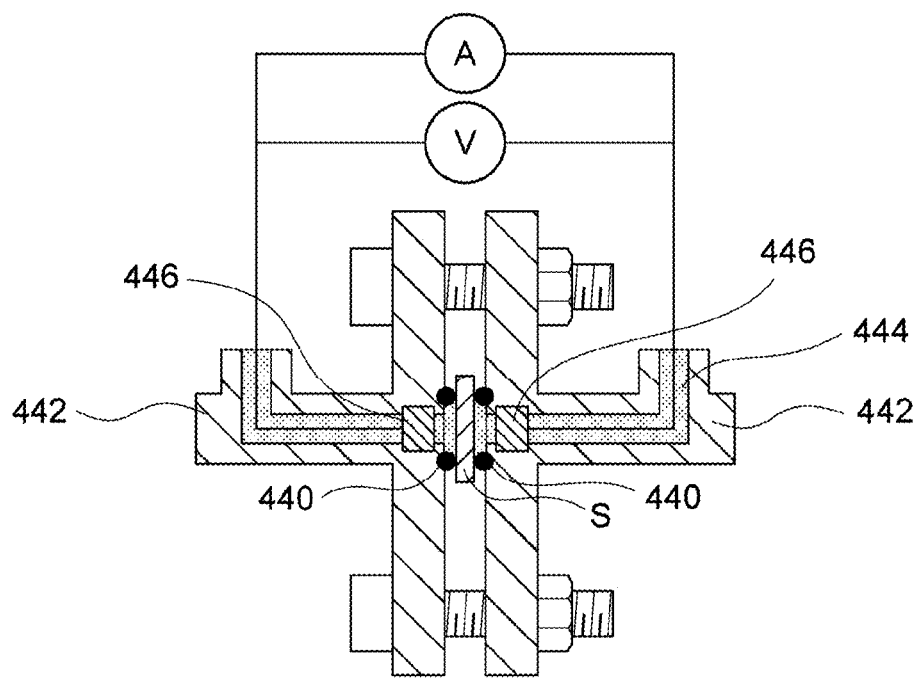
FIG. 4 is a schematic cross-sectional view illustrating an electrochemical measurement system used in Examples A1 to D2.

The ionic conductivity of the LDH separator in the electrolytic solution was measured with an electrochemical measurement system shown in FIG. 4. An LDH separator sample S was sandwiched between two silicone gaskets 440 having a thickness of 1 mm and assembled into a PTFE flange-type cell 442 having an inner diameter of 6 mm. Electrodes 446 made of #100 nickel wire mesh were formed into a cylindrical shape having a diameter of 6 mm, and assembled into the cell 442, and the distance between the electrodes was 2.2 mm. The cell 442 was filled with 5.4M aqueous KOH solution as an electrolytic solution 444. Using the electrochemical measurement system (potentio-galvanostat frequency responsive analyzers 1287A and 1255B, manufactured by Solartron), the sample was subjected to measurement under the conditions of a frequency range of 1 MHz to 0.1 Hz and an applied voltage of 10 mV, and the resistance of the LDH separator sample S was determined from the intercept across a real number axis. The conductivity was calculated with the resistance, the thickness, and the area of the LDH separator.

Example A1 (Comparative)

(1) Preparation of Polymeric Porous Substrate

A commercially available polyethylene microporous membrane having a porosity of 50%, a mean pore size of 0.1 μm and a thickness of 20 μm as a polymeric porous substrate was cut out into a size of 2.0 cm×2.0 cm.

(2) Coating of Alumina/Titania Sol on Polymeric Porous Substrate

An amorphous alumina solution (Al-ML15, manufactured by Taki Chemical Co., Ltd.) and a titanium oxide sol solution (M6, manufactured by Taki Chemical Co., Ltd.) were mixed at Ti/Al molar ratio of 2 to yield a mixed sol. The mixed sol was allowed to permeate the substrate prepared in Process (1) by dip coating. In dip coating, the substrate was immersed in 100 mL of the mixed sol, pulled up vertically and dried in a dryer at 90° C. for five minutes.

(3) Preparation of Aqueous Raw Material Solution

Nickel nitrate hexahydrate (Ni(NO$_3$)$_2$·6H$_2$O, manufactured by Kanto Chemical Co., Inc.), and urea ((NH$_2$)$_2$CO, manufactured by Sigma-Aldrich Corporation) were provided as raw materials. Nickel nitrate hexahydrate was weighed to be 0.015 mol/L and placed in a beaker. Ion-exchanged water was added into a total volume of 75 mL. After stirring the solution, the urea weighed at a urea/NO$_3$$^-$ molar ratio of 16 was added, and further stirred to give an aqueous raw material solution.

(4) Formation of Membrane By Hydrothermal Treatment

The aqueous raw material solution and the dip-coated substrate were encapsulated into a Teflon™ autoclave (the internal volume: 100 mL, covered with stainless steel jacket). The substrate was horizontally fixed away from the bottom of the Teflon™ autoclave such that the solution was in contact with the two surfaces of the substrate. An LDH was then formed on the surface and the interior of the substrate by a hydrothermal treatment at a temperature of 120° C. for 24 hour. After a predetermined period, the substrate was removed from the autoclave, washed with ion-exchanged water, and dried at 70° C. for ten hours to form the LDH in the pores of porous substrate and give an LDH-containing composite material.

(5) Densification by Roll Pressing

The composite material containing the above LDH is sandwiched between a pair of PET films (Lumirror™ manufactured by Toray Industries, Inc., a thickness of 40 μm), and then roll-pressed at a rotation rate of 3 mm/s, at a roller temperature of 110° C., and with a gap between rollers of 60 μm to give an LDH separator.

(6) Results of Evaluation

The resultant LDH separator was evaluated in accordance with Evaluations 1 to 6. As a result of Evaluation 1, this LDH separator was identified as LDH (hydrotalcite compound). The results of Evaluations 2 to 6 are as shown in Table 1. As shown in Table 1, zinc dendrites did not cause short circuiting after continuous charge up to 100 hours, but caused short circuiting after continuous charge for less than 200 hours in Evaluation 4.

Examples A2 and A3 (Reference)

Figure 5A:
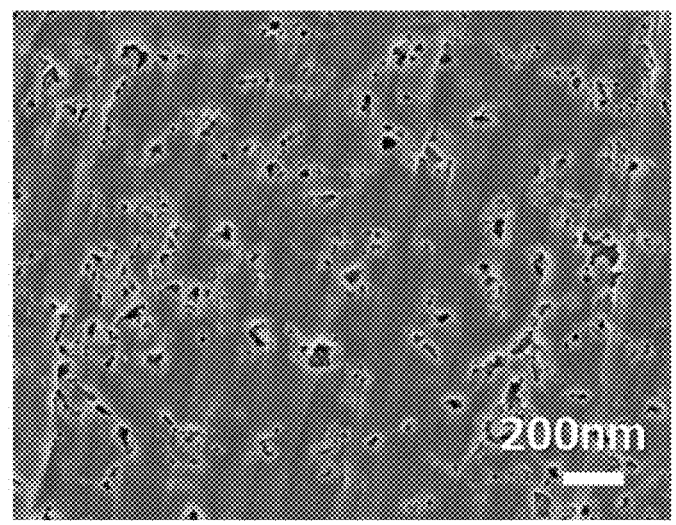
FIG. 5A is a cross-sectional field-emission scanning electron microscopic (FE-SEM) image of the peripheral region (the region at a depth of 1 to 4 μm from the face) of an LDH separator produced in Example A3. In the drawing, the gray areas correspond to the porous polymeric substrate, the white areas LDH, and the black areas remaining pores.
Figure 5B:
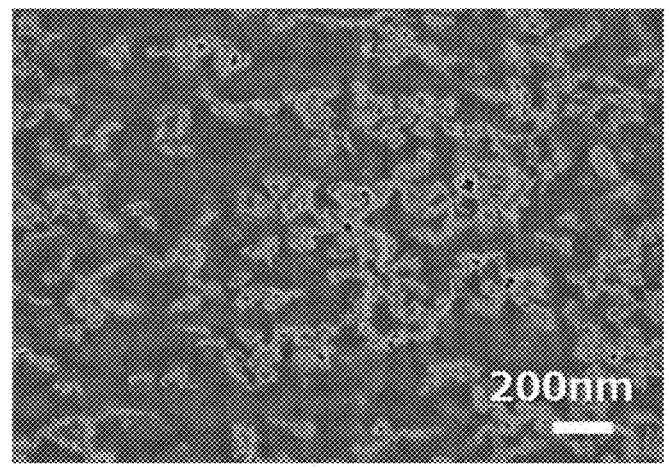
FIG. 5B is a cross-sectional FE-SEM image of the central region of the LDH separator produced in Example A3. In the drawing, the gray areas correspond to the porous polymeric substrate, the white areas the LDH, and the black areas remaining pores.

Each LDH separator was produced and evaluated as in Example A1 except that the drying temperature after the immersion with alumina/titania sol was varied to the values shown in Table 1 in Process (2). As a result of Evaluation 1, the LDH separators in these Examples were identified as LDH (hydrotalcite compound). Table 1 shows the results of Evaluations 2 to 6. As shown in Table 1, zinc dendrites did not cause short circuiting even after continuous charge for 200 hours or more in Examples A2 and A3. FIGS. 5A and 5B respectively show cross-sectional FE-SEM images, captured in Evaluation 3, of the peripheral region and the central region of the LDH separator according to Example A3.

Example A4 (Comparative)

The LDH separator was produced and evaluated as in Example A1 except that the densification by roll pressing in Process (5) was not carried out. The results of Evaluation 1 indicated that the LDH separator of this Example was identified as LDH (hydrotalcite compound). Table 1 shows the results of Evaluations 2 to 6. As shown in Table 1, zinc dendrites caused short circuiting after continuous charge for less than 100 hours in Evaluation 4.

Examples A5 and A6 (Reference)

An LDH separator was produced and evaluated as in Example A1 except for the following conditions a) to c).

a) The drying temperature after the immersion with alumina/titania sol was varied to the values shown in Table 1 in Process (2).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, the urea weighed at a urea/$NO_3^-$ molar ratio of 8 was added, and further stirred to give an aqueous raw material solution.

c) The hydrothermal temperature in Process (4) was 90° C.

As a result of Evaluation 1, this LDH separator was identified as LDH (hydrotalcite compound). The results of Evaluations 2 to 6 are shown in Table 1. As shown in Table 1, zinc dendrites did not cause short circuiting even after continuous charge for 200 hours or more in Examples A5 and A6.

TABLE 1

| | Production Conditions | | | | Evaluations of LDH separator | | | | Continuous charge test | |
|---|---|---|---|---|---|---|---|---|---|---|
| | | Drying temperature after immersion with alumina/ titania sol (° C.) | Roll Temp. (° C.) | Thickness (μm) | Mean porosity (%) | | Helium permeability (cm.min · atm) | Ion conductivity (mS/cm) | Short circuiting over continuous charging time up to 100 hours | Short circuiting over continuous charging time up to 200 hours |
| | Composition of LDH separator | | | | peripheral region (the region at a depth of 1 to 4 μm from the face) | Central region | | | | |
| Ex. A1* | Ni—Al, Ti | 90 | 110 | 13 | 1 | 1 | 0.0 | 3.0 | None | Found |
| Ex. A2# | Ni—Al, Ti | 70 | 110 | 13 | 5 | 1 | 0.0 | 3.0 | None | None |
| Ex. A3# | Ni—Al, Ti | 50 | 110 | 13 | 10 | 1 | 0.0 | 3.1 | None | None |
| Ex. A4# | Ni—Al, Ti | 90 | — | 16 | 20 | 20 | 100 | 3.2 | Found | — |
| Ex. A5# | Mg—Al, Ti | 70 | 110 | 13 | 6 | 1 | 0.0 | 3.0 | None | None |
| Ex. A6# | Mg—Al, Ti | 50 | 110 | 14 | 12 | 1 | 0.0 | 3.1 | None | None |

*indicates Comparative Example.
indicates Reference Example.

Examples B1 to B8

Examples B1 to B7 shown below are reference examples for LDH-like compound separators, while Examples B8 shown below is a comparative example for an LDH separator. The LDH-like compound separators and LDH separator will be collectively referred to as hydroxide ion-conductive separators. The method for evaluating the hydroxide ion-conductive separators produced in the following examples was as follows.

Evaluation 1: Observation of Surface Microstructure

The surface microstructure of the hydroxide ion-conductive separator was observed using a scanning electron microscope (SEM, JSM-6610LV, manufactured by JEOL Ltd.) at an acceleration voltage of 10 to 20 kV.

Evaluation 2: STEM Analysis of Layered Structure

The layered structure of the hydroxide ion-conductive separator was observed using a scanning transmission electron microscope (STEM) (product name: JEM-ARM200F, manufactured by JEOL Ltd.) at an acceleration voltage of 200 kV.

Evaluation 3: Elemental Analysis Evaluation (EDS)

A surface of the hydroxide ion-conductive separator was subjected to compositional analysis using an EDS analyzer (device name: X-act, manufactured by Oxford Instruments), to calculate the composition ratio (atomic ratio) Mg:Ti:Y:Al. This analysis was performed by 1) capturing an image at an acceleration voltage of 20 kV and a magnification of 5,000 times, 2) performing analysis at three points at intervals of about 5 μm in the point analysis mode, 3) repeating procedures 1) and 2) above once again, and 4) calculating an average of the six points in total.

Evaluation 4: X-Ray Diffraction Measurement

Using an X-ray diffractometer (RINT TTR III, manufactured by Rigaku Corporation), the crystalline phase of the hydroxide ion-conductive separator was measured under the measurement conditions of voltage: 50 kV, current value: 300 mA, and measurement range: 5 to 40°, to obtain an XRD profile. Further, the interlayer distance in the layered crystal structure was determined by Bragg's equation using 2θ corresponding to peaks derived from the LDH-like compound.

Evaluation 5: The Permeation Measurement

In order to evaluate the denseness of the hydroxide ion-conductive separator in view of the He permeation, a He permeation test was performed in the same procedure as in Evaluation 5 of Examples A1 to A6.

Evaluation 6: Measurement of Ion Conductivity

The conductivity of the hydroxide ion-conductive separator in the electrolytic solution was measured using the electrochemical measurement system shown in FIG. 4, as follows. A hydroxide ion-conductive separator sample S was sandwiched by 1-mm thick silicone packings 440 from both sides, to be assembled in a PTFE flange-type cell 442 with an inner diameter of 6 mm. As electrodes 446, nickel wire meshes of #100 mesh were assembled in the cell 442 into a cylindrical shape with a diameter of 6 mm, so that the distance between the electrodes was 2.2 mm. The cell 442 was filled with a 5.4 M KOH aqueous solution as an electrolytic solution 444. Using electrochemical measurement systems (potentiostat/galvanostat-frequency response analyzers Type 1287A and Type 1255B, manufactured by Solartron Metrology), measurement was performed under the conditions of a frequency range of 1 MHz to 0.1 Hz and an applied voltage of 10 mV, and the real axis intercept was taken as the resistance of the hydroxide ion conductive separator sample S. The same measurement as above was carried out without the hydroxide ion-conductive separator sample S, to determine a blank resistance. The difference between the resistance of the hydroxide ion-conductive separator sample S and the blank resistance was taken as the resistance of the hydroxide ion-conductive separator. The conductivity was determined using the resistance of the hydroxide ion-conductive separator obtained, and the thickness and area of the hydroxide ion-conductive separator.

Evaluation 7: Evaluation of Alkali Resistance

A 5.4 M KOH aqueous solution containing zinc oxide at a concentration of 0.4 M was prepared. 0.5 mL of the KOH aqueous solution prepared and a hydroxide ion-conductive separator sample with a size of 2 cm square were put into a closed container made of Teflon®. Thereafter, it was maintained at 90° C. for one week (that is, 168 hours), and then the hydroxide ion-conductive separator sample was taken out of the closed container. The hydroxide ion-conductive separator sample taken out was dried overnight at room temperature. For the sample obtained, the He permeability was calculated in the same manner as in Evaluation 5, to determine whether or not the He permeability changed before and after the immersion in alkali.

Evaluation 8: Evaluation of Dendrite Resistance (Cycle Test)

In order to evaluate the effect of suppressing short circuits due to zinc dendrites (dendrite resistance) of the hydroxide ion-conductive separator, a cycle test was performed, as follows. First, each of the positive electrode (containing nickel hydroxide and/or nickel oxyhydroxide) and the negative electrode (containing zinc and/or zinc oxide) was wrapped with a non-woven fabric, and the current extraction terminal was welded thereto. The positive electrode and the negative electrode thus prepared were opposed to each other via the hydroxide ion-conductive separator and sandwiched between laminate films provided with current outlets, and three sides of the laminate films were heat-sealed. An electrolytic solution (a solution in which 0.4 M zinc oxide was dissolved in a 5.4 M KOH aqueous solution) was added to the cell container with the top open thus obtained, and the positive electrode and the negative electrode was sufficiently impregnated with the electrolytic solution by vacuuming or the like. Thereafter, the remaining one side of the laminate films was heat-sealed, to form a simple sealed cell. Using a charge/discharge device (TOSCAT3100, manufactured by TOYO SYSTEM CO., LTD.), the simple sealed cell was charged at 0.1 C and discharged at 0.2 C for chemical conversion. Thereafter, a 1-C charge/discharge cycle was conducted. While repeating the charge/discharge cycle under the same conditions, the voltage between the positive electrode and the negative electrode was monitored with a voltmeter, and the presence or absence of sudden voltage drops (specifically, voltage drops of 5 mV or more from the voltage that was just previously plotted) following short circuits due to zinc dendrites between the positive electrode and the negative electrode was examined and evaluated according to the following criteria.

No short circuits occurred: No sudden voltage drops as described above were observed during charging even after 300 cycles.

Short circuits occurred: Sudden voltage drops as described above were observed during charging in less than 300 cycles.

Example B1 (Reference)

(1) Preparation of Porous Polymer Substrate

A commercially available polyethylene microporous membrane with a porosity of 50%, a mean pore size of 0.1 μm, and a thickness of 20 μm was prepared as a porous polymer substrate and cut out into a size of 2.0 cm×2.0 cm.

(2) Titania Sol Coating on Porous Polymer Substrate

The substrate prepared by procedure (1) above was coated with a titanium oxide sol solution (M6, manufactured by Taki Chemical Co., Ltd.) by dip coating. Dip coating was performed by immersing the substrate in 100 ml of the sol solution and pulling it out perpendicularly, followed by drying at room temperature for 3 hours.

(3) Production of Raw Material Aqueous Solution

As raw materials, magnesium nitrate hexahydrate (Mg(NO$_3$)$_2$·6H$_2$O, manufactured by KANTO CHEMICAL CO., INC.) and urea ((NH$_2$)$_2$CO, manufactured by Sigma-Aldrich Corporation) were prepared. The magnesium nitrate hexahydrate was weighed to 0.015 mol/L and put into a beaker, and deionized water was added thereto so that the total amount was 75 ml. After stirring the solution obtained, urea weighed at a ratio urea/NO$_3^-$ (molar ratio) of 48 was added into the solution, followed by further stirring, to obtain a raw material aqueous solution.

(4) Membrane Formation by Hydrothermal Treatment

The raw material aqueous solution and the dip-coated substrate were enclosed together in a closed container made of Teflon® (autoclave container, content: 100 ml, with an outer stainless steel jacket). At this time, the substrate was lifted from the bottom of the closed container made of Teflon® and fixed and installed vertically so that the solution was in contact with both sides of the substrate. Thereafter, an LDH-like compound was formed on the surface and inside the substrate by applying hydrothermal treatment at a hydrothermal temperature of 120° C. for 24 hours. After a lapse of a predetermined time, the substrate was taken out of the closed container, washed with deionized water, and dried at 70° C. for 10 hours, to form an LDH-like compound in the pores of the porous substrate. Thus, an LDH-like compound separator was obtained.

(5) Densification by Roll Pressing

The LDH-like compound separator was sandwiched by a pair of PET films (Lumirror®, manufactured by Toray Industries, Inc., with a thickness of 40 μm) and roll-pressed at a roll rotation speed of 3 mm/s and a roller heating temperature of 70° C. with a roll gap of 70 μm, to obtain an LDH-like compound separator that was further densified.

(6) Evaluation Results

The LDH-like compound separator obtained was subjected to Evaluations 1 to 8. The results were as follows.

Figure 6A:
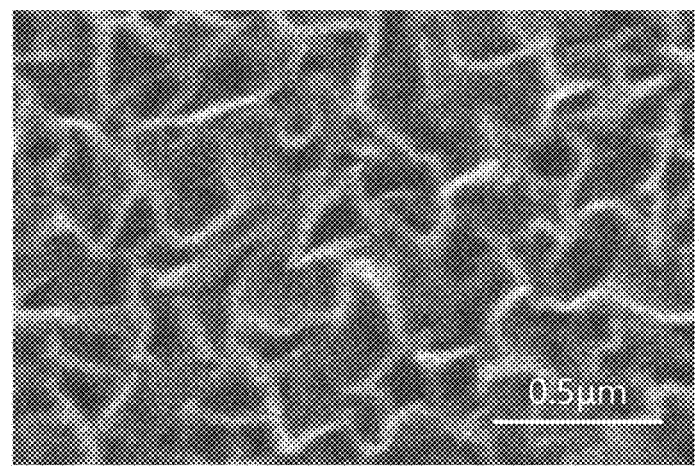
FIG. 6A is an SEM image of a surface of an LDH-like compound produced in Example B1.

Evaluation 1: The SEM image of the surface microstructure of the LDH-like compound separator obtained in Example B1 (before roll pressing) was as shown in FIG. 6A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg and Ti, which were constituent elements of the LDH-like compound, were detected on the surface of the LDH-like compound separator. Further, the composition ratio (atomic ratio) of Mg and Ti on the surface of the LDH-like compound separator, which was calculated by EDS elemental analysis, was as shown in Table 1.

Figure 6B:
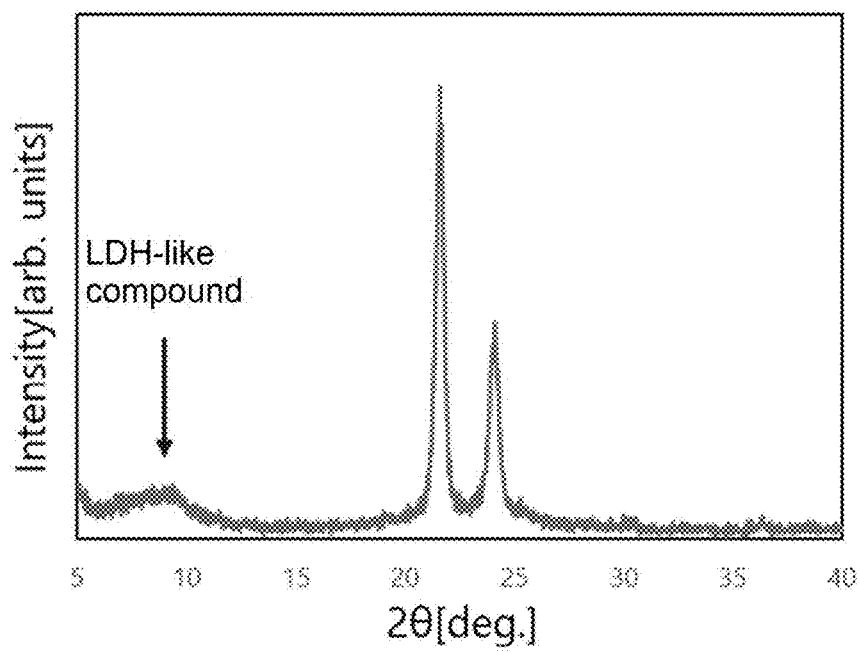
FIG. 6B is the result of X-ray diffraction of the LDH-like compound separator produced in Example B1.

Evaluation 4: FIG. 6B shows the XRD profile obtained in Example B1. In the XRD profile obtained, a peak was observed around 2θ=9.4°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at 20<2θ°<25 in the XRD profile are peaks derived from polyethylene constituting the porous substrate. Further, the interlayer distance in the layered crystal structure of the LDH-like compound was 0.94 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B2 (Reference)

An LDH-like compound separator was produced and evaluated in the same manner as in Example B1 except that the raw material aqueous solution was produced as follows in procedure (3) above, and the temperature for the hydrothermal treatment was changed to 90° C. in procedure (4) above.

(Production of Raw Material Aqueous Solution)

As raw materials, magnesium nitrate hexahydrate (Mg(NO$_3$)$_2$·6H$_2$O, manufactured by KANTO CHEMICAL CO., INC.) and urea ((NH$_2$)$_2$CO, manufactured by Sigma-Aldrich Corporation) were prepared. The magnesium nitrate hexahydrate was weighed to 0.03 mol/L and put into a beaker, and deionized water was added thereto so that the total amount was 75 ml. After stirring the solution obtained, urea weighed at a ratio urea/NO$_3$-(molar ratio) of 8 was added into the solution, followed by further stirring, to obtain a raw material aqueous solution.

Figure 7A:
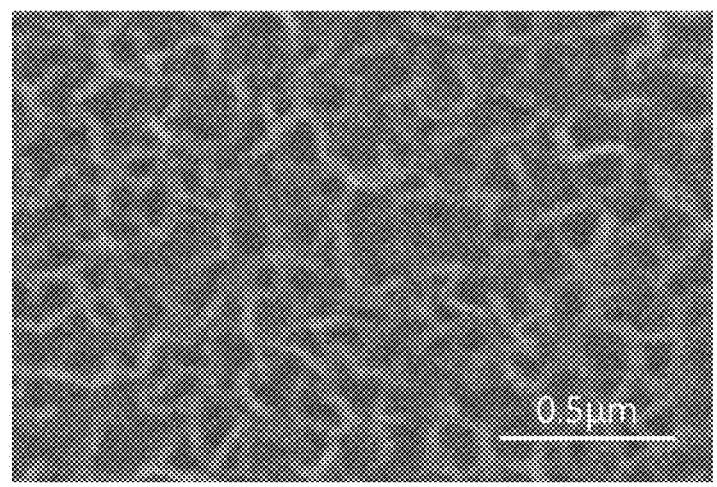
FIG. 7A is an SEM image of a surface of an LDH-like compound separator produced in Example B2.

Evaluation 1: The SEM image of the surface microstructure of the LDH-like compound separator obtained in Example B2 (before roll pressing) was as shown in FIG. 7A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg and Ti, which were constituent elements of the LDH-like compound, were detected on the surface of the LDH-like compound separator. Further, the composition ratio (atomic ratio) of Mg and Ti on the surface of the LDH-like compound separator, which was calculated by EDS elemental analysis, was as shown in Table 2.

Figure 7B:
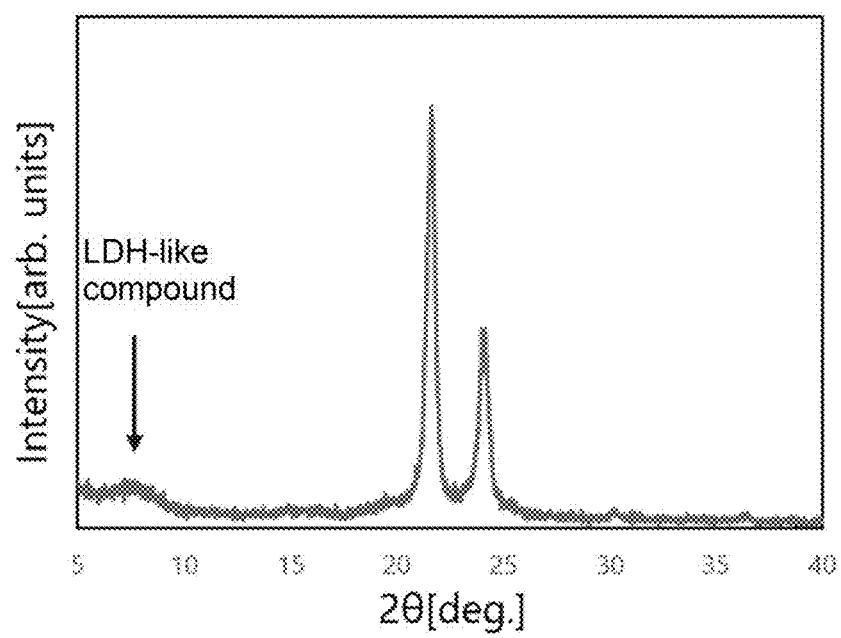
FIG. 7B is the result of X-ray diffraction of the LDH-like compound separator produced in Example B2.

Evaluation 4: FIG. 7B shows the XRD profile obtained in Example B2. In the XRD profile obtained, a peak was observed around 2θ=7.2°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at 20<2θ°<25 in the XRD profile are peaks derived from polyethylene constituting the porous substrate.

Further, the interlayer distance in the layered crystal structure of the LDH-like compound was 1.2 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min-atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B3 (Reference)

An LDH-like compound separator was produced and evaluated in the same manner as in Example B1 except that the porous polymer substrate was coated with titania and yttria sols as follows, instead of procedure (2) above.
(Titania-Yttria Sol Coating on Porous Polymer Substrate)

A titanium oxide sol solution (M6, manufactured by Taki Chemical Co., Ltd.) and a yttrium sol were mixed at a molar ratio Ti/Y of 4. The substrate prepared in procedure (1) above was coated with the mixed solution obtained by dip coating. Dip coating was performed by immersing the substrate in 100 ml of the mixed solution and pulling it out perpendicularly, followed by drying at room temperature for 3 hours.

Figure 8A:
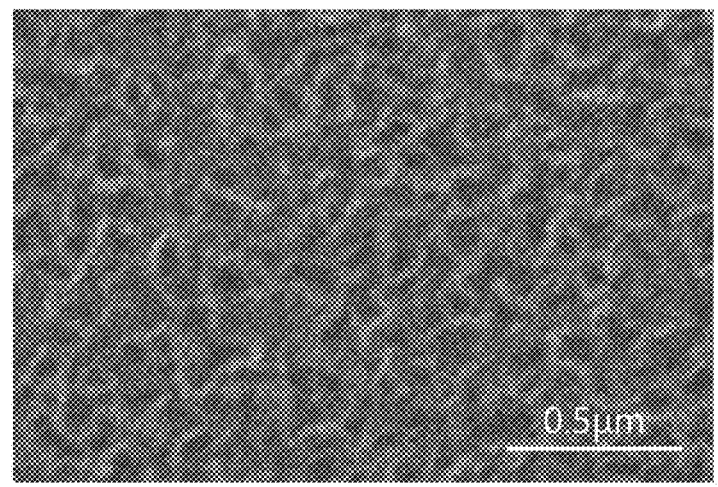
FIG. 8A is an SEM image of a surface of an LDH-like compound separator produced in Example B3.

Evaluation 1: The SEM image of the surface microstructure of the LDH-like compound separator obtained in Example B3 (before roll pressing) was as shown in FIG. 8A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Ti, and Y, which were constituent elements of the LDH-like compound, were detected on the surface of the LDH-like compound separator. Further, the composition ratio (atomic ratio) of Mg, Ti, and Y on the surface of the LDH-like compound separator, which was calculated by EDS elemental analysis, was as shown in Table 2.

Figure 8B:
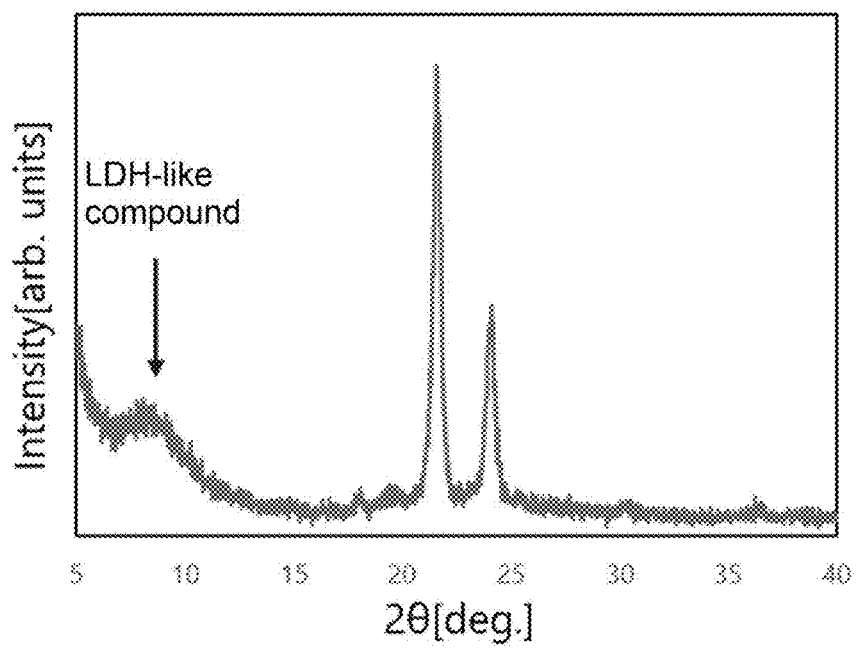
FIG. 8B is the result of X-ray diffraction of the LDH-like compound separator produced in Example B3.

Evaluation 4: FIG. 8B shows the XRD profile obtained in Example B3. In the XRD profile obtained, a peak was observed around 2θ=8.0°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at 20<2θ°<25 in the XRD profile are peaks derived from polyethylene constituting the porous substrate. Further, the interlayer distance in the layered crystal structure of the LDH-like compound was 1.1 nm.

Evaluation 5: As shown in Table 2, it was confirmed that the He permeability was 0.0 cm/min-atm, indicating that the denseness was extremely high.

Evaluation 6: As shown in Table 2, it was confirmed that the ion conductivity was high.

Evaluation 7: The He permeability after immersion in alkali was 0.0 cm/min-atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B4 (Reference)

An LDH-like compound separator was produced and evaluated in the same manner as in Example B1 except that the porous polymer substrate was coated with titania, yttria, and alumina sols as follows, instead of procedure (2) above.
(Titania-Yttria-Alumina Sol Coating on Porous Polymer Substrate)

A titanium oxide sol solution (M6, manufactured by Taki Chemical Co., Ltd.), a yttrium sol, and an amorphous alumina solution (Al-ML15, manufactured by Taki Chemical Co., Ltd.) were mixed at a molar ratio Ti/(Y+Al) of 2 and a molar ratio Y/Al of 8. The substrate prepared in procedure (1) above was coated with the mixed solution by dip coating. Dip coating was performed by immersing the substrate in 100 ml of the mixed solution and pulling it out perpendicularly, followed by drying at room temperature for 3 hours.

Figure 9A:
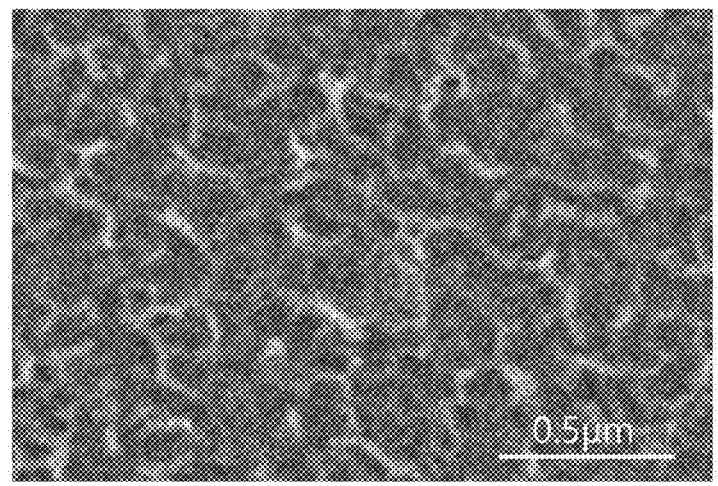
FIG. 9A is an SEM image of a surface of an LDH-like compound separator produced in Example B4.

Evaluation 1: The SEM image of the surface microstructure of the LDH-like compound separator obtained in Example B4 (before roll pressing) was as shown in FIG. 9A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Al, Ti, and Y, which were constituent elements of the LDH-like compound, were detected on the surface of the LDH-like compound separator. Further, the composition ratio (atomic ratio) of Mg, Al, Ti, and Y on the surface of the LDH-like compound separator, which was calculated by EDS elemental analysis, was as shown in Table 2.

Figure 9B:
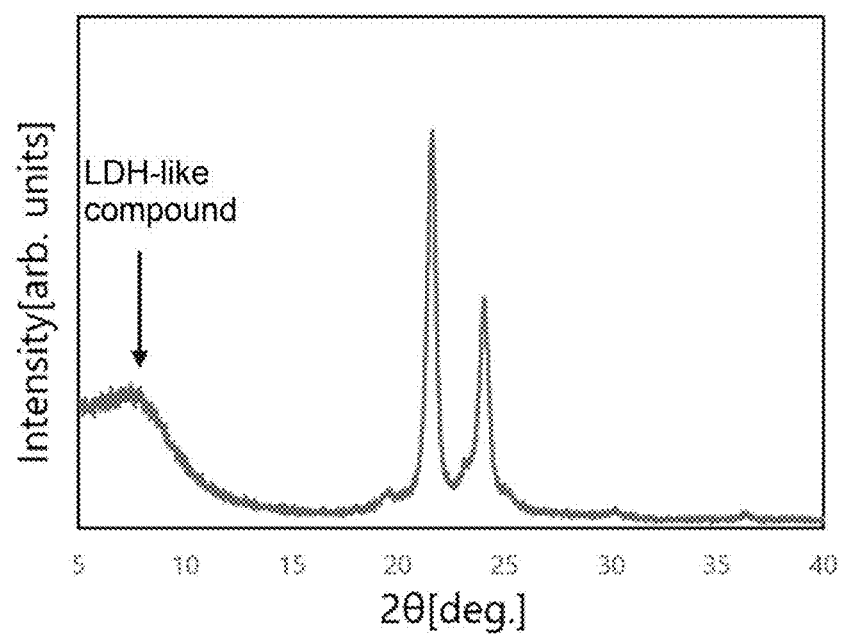
FIG. 9B is the result of X-ray diffraction of the LDH-like compound separator produced in Example B4.

Evaluation 4: FIG. 9B shows the XRD profile obtained in Example B4. In the XRD profile obtained, a peak was observed around 2θ=7.8°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at 20<2θ°<25 in the XRD profile are peaks derived from polyethylene constituting the porous substrate. Further, the interlayer distance in the layered crystal structure of the LDH-like compound was 1.1 nm.

Evaluation 5: As shown in Table 2, it was confirmed that the He permeability was 0.0 cm/min-atm, indicating that the denseness was extremely high.

Evaluation 6: As shown in Table 2, it was confirmed that the ion conductivity was high.

Evaluation 7: The He permeability after immersion in alkali was 0.0 cm/min-atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B5 (Reference)

An LDH-like compound separator was produced and evaluated in the same manner as in Example B1 except that the porous polymer substrate was coated with titania and yttria sols as follows, instead of procedure (2) above, and the raw material aqueous solution was produced as follows in procedure (3) above.

(Titania-Yttria Sol Coating on Porous Polymer Substrate)

A titanium oxide sol solution (M6, manufactured by Taki Chemical Co., Ltd.) and a yttrium sol were mixed at a molar ratio Ti/Y of 18. The substrate prepared in procedure (1) above was coated with the mixed solution obtained by dip coating. Dip coating was performed by immersing the substrate in 100 ml of the mixed solution and pulling it out perpendicularly, followed by drying at room temperature for 3 hours.

(Production of Raw Material Aqueous Solution)

As raw materials, magnesium nitrate hexahydrate (Mg$(NO_3)_2 \cdot 6H_2O$, manufactured by KANTO CHEMICAL CO., INC.) and urea ($(NH_2)_2CO$, manufactured by Sigma-Aldrich Corporation) were prepared. The magnesium nitrate hexahydrate was weighed to 0.0075 mol/L and put into a beaker, and deionized water was added thereto so that the total amount was 75 ml. Then, the solution obtained was stirred. Urea weighed at a ratio urea/$NO_3^-$ (molar ratio)=96 was added into the solution, followed by further stirring, to obtain a raw material aqueous solution.

Figure 10A:
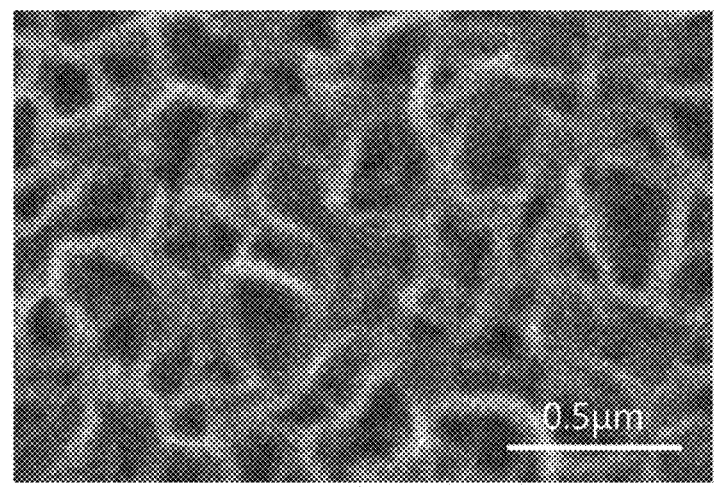
FIG. 10A is an SEM image of a surface of an LDH-like compound separator produced in Example B5.

Evaluation 1: The SEM image of the surface microstructure of the LDH-like compound separator obtained in Example B5 (before roll pressing) was as shown in FIG. 10A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Ti, and Y, which were constituent elements of the LDH-like compound, were detected on the surface of the LDH-like compound separator. Further, the composition ratio (atomic ratio) of Mg, Ti, and Y on the surface of the LDH-like compound separator, which was calculated by EDS elemental analysis, was as shown in Table 2.

Figure 10B:
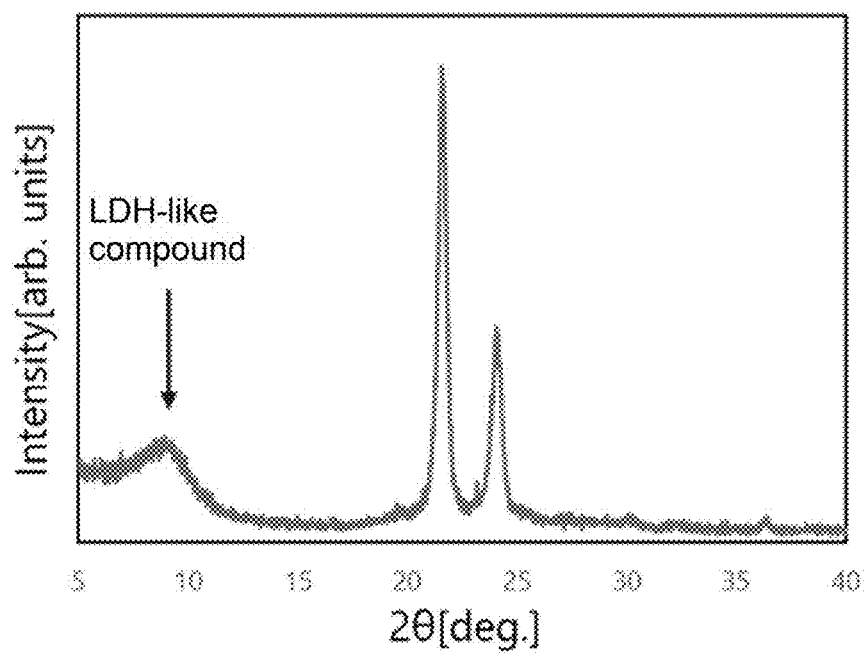
FIG. 10B is the result of X-ray diffraction of the LDH-like compound separator produced in Example B5.

Evaluation 4: FIG. 10B shows the XRD profile obtained in Example B5. In the XRD profile obtained, a peak was observed around $2\theta=8.9°$. Generally, the (003) peak position of LDH is observed at $2\theta=11$ to $12°$, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 0.99 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B6 (Reference)

An LDH-like compound separator was produced and evaluated in the same manner as in Example B1 except that the porous polymer substrate was coated with titania and alumina sols as follows, instead of procedure (2) above, and the raw material aqueous solution was produced as follows in procedure (3) above.

(Titania-Alumina Sol Coating on Porous Polymer Substrate)

A titanium oxide sol solution (M6, manufactured by Taki Chemical Co., Ltd.) and an amorphous alumina solution (Al-ML15, manufactured by Taki Chemical Co., Ltd.) were mixed at a molar ratio Ti/Al of 18. The substrate prepared in procedure (1) above was coated with the mixed solution by dip coating. Dip coating was performed by immersing the substrate in 100 ml of the mixed solution and pulling it out perpendicularly, followed by drying at room temperature for 3 hours.

(Production of Raw Material Aqueous Solution)

As raw materials, magnesium nitrate hexahydrate (Mg$(NO_3)_2 \cdot 6H_2O$, manufactured by KANTO CHEMICAL CO., INC.), yttrium nitrate n hydrate ($Y(NO_3)_3 \cdot nH_2O$, manufactured by FUJIFILM Wako Pure Chemical Corporation), and urea ($(NH_2)_2CO$, manufactured by Sigma-Aldrich Corporation) were prepared. The magnesium nitrate hexahydrate was weighed to 0.0015 mol/L and put into a beaker. Further, the yttrium nitrate n hydrate was weighed to 0.0075 mol/L and put into the beaker, and deionized water was added thereto so that the total amount was 75 ml. Then, the solution obtained was stirred. Urea weighed at a ratio urea/$NO_3^-$ (molar ratio) of 9.8 was added into the solution, followed by further stirring, to obtain a raw material aqueous solution.

Figure 11A:
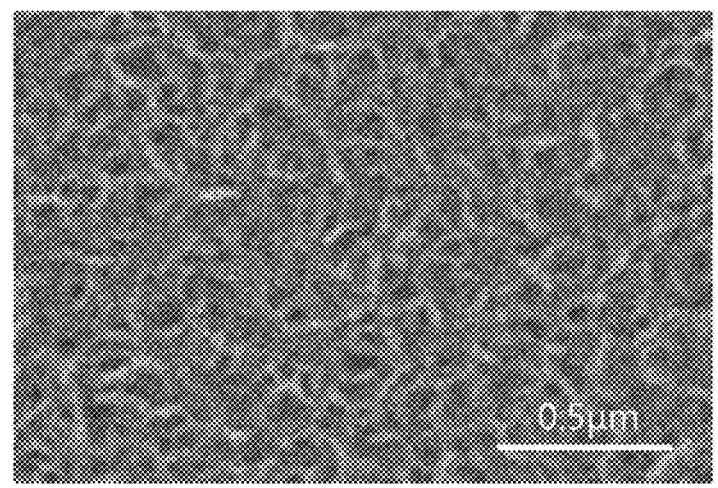
FIG. 11A is an SEM image of a surface of an LDH-like compound separator produced in Example B6.

Evaluation 1: The SEM image of the surface microstructure of the LDH-like compound separator obtained in Example B6 (before roll pressing) was as shown in FIG. 11A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Al, Ti, and Y, which were constituent elements of the LDH-like compound, were detected on the surface of the LDH-like compound separator. Further, the composition ratio (atomic ratio) of Mg, Al, Ti, and Y on the surface of the LDH-like compound separator, which was calculated by EDS elemental analysis, was as shown in Table 2.

Figure 11B:
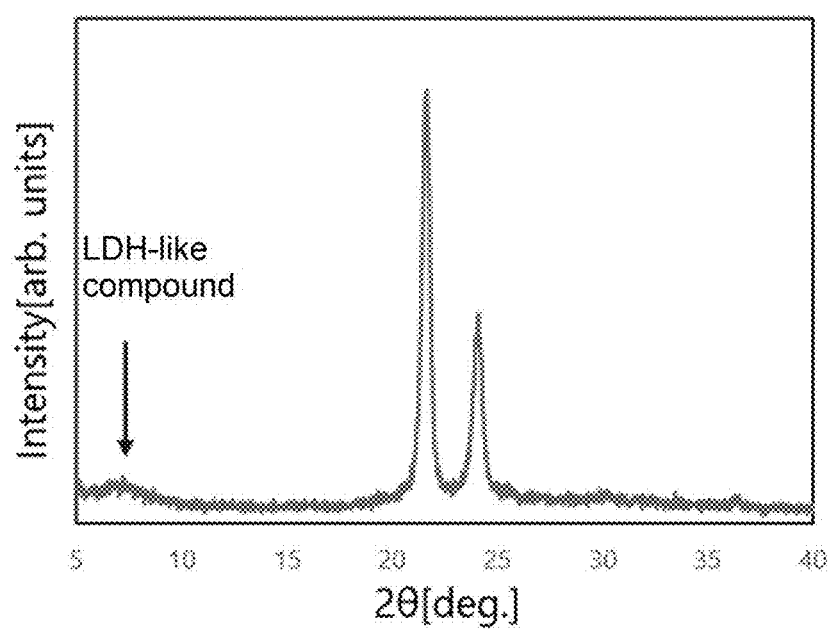
FIG. 11B is the result of X-ray diffraction of the LDH-like compound separator produced in Example B6.

Evaluation 4: FIG. 11B shows the XRD profile obtained in Example B6. In the XRD profile obtained, a peak was observed around 2θ=7.2°. Generally, the (003) peak position of LDH is observed at 2θ=11 to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at 20<2θ°<25 in the XRD profile are peaks derived from polyethylene constituting the porous substrate. Further, the interlayer distance in the layered crystal structure of the LDH-like compound was 1.2 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B7 (Reference)

An LDH-like compound separator was produced and evaluated in the same manner as in Example B6 except that the raw material aqueous solution was produced as follows in procedure (3) above.

(Production of Raw Material Aqueous Solution)

As raw materials, magnesium nitrate hexahydrate (Mg(NO$_3$)$_2$·6H$_2$O, manufactured by KANTO CHEMICAL CO., INC.), yttrium nitrate n hydrate (Y(NO$_3$)$_3$·nH$_2$O, manufactured by FUJIFILM Wako Pure Chemical Corporation), and urea ((NH$_2$)$_2$CO, manufactured by Sigma-Aldrich Corporation) were prepared. The magnesium nitrate hexahydrate was weighed to 0.0075 mol/L and put into a beaker. Further, the yttrium nitrate n hydrate was weighed to 0.0075 mol/L and put into the beaker, and deionized water was added thereto so that the total amount was 75 ml. Then, the solution obtained was stirred. Urea weighed at a ratio urea/NO$_3^-$ (molar ratio) of 25.6 was added into the solution, followed by further stirring, to obtain a raw material aqueous solution.

Figure 12:
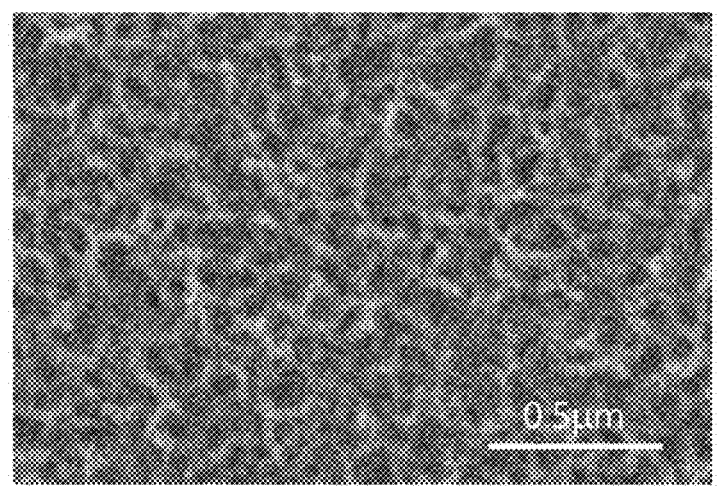
FIG. 12 is an SEM image of a surface of an LDH-like compound separator produced in Example B7.

Evaluation 1: The SEM image of the surface microstructure of the LDH-like compound separator obtained in Example B7 (before roll pressing) was as shown in FIG. 12.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Al, Ti, and Y, which were constituent elements of the LDH-like compound, were detected on the surface of the LDH-like compound separator. Further, the composition ratio (atomic ratio) of Mg, Al, Ti, and Y on the surface of the LDH-like compound separator, which was calculated by EDS elemental analysis, was as shown in Table 2.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B8 (Comparison)

An LDH separator was produced and evaluated in the same manner as in Example B1 except that alumina sol coating was performed as follows, instead of procedure (2) above.

(Alumina Sol Coating on Porous Polymer Substrate)

The substrate prepared in procedure (1) above was coated with an amorphous alumina sol (Al-ML15, manufactured by Taki Chemical Co., Ltd.) by dip coating. Dip coating was performed by immersing the substrate in 100 ml of the amorphous alumina sol and pulling it out perpendicularly, followed by drying at room temperature for 3 hours.

Figure 13A:
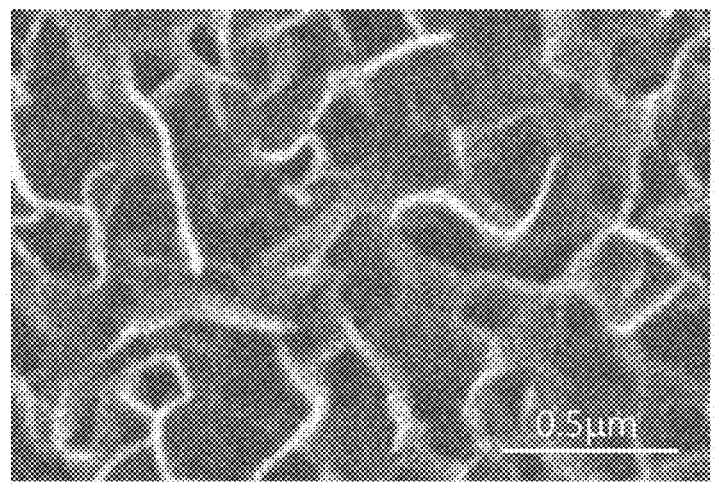
FIG. 13A is an SEM image of a surface of an LDH separator produced in Example B8 (comparison).

Evaluation 1: The SEM image of the surface microstructure of the LDH separator obtained in Example B8 (before roll pressing) was as shown in FIG. 13A.

Evaluation 2: From the result that layered plaids could be observed, it was confirmed that the portion of the LDH separator other than the porous substrate was a compound with a layered crystal structure.

Evaluation 3: As a result of EDS elemental analysis, Mg and Al, which were constituent elements of LDH, were detected on the surface of the LDH separator. Further, the composition ratio (atomic ratio) of Mg and Al on the surface of the LDH separator, which was calculated by EDS elemental analysis, was as shown in Table 2.

Figure 13B:
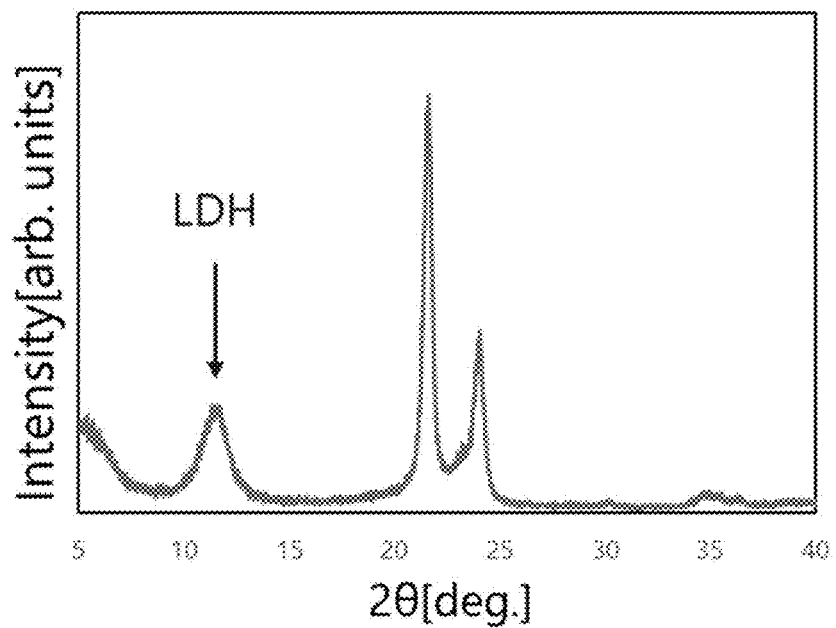
FIG. 13B is the result of X-ray diffraction of the LDH separator produced in Example B8 (comparison).

Evaluation 4: FIG. 13B shows the XRD profile obtained in Example B8. From a peak around 2θ=11.5° in the XRD profile obtained, the LDH separator obtained in Example B8 was identified to be an LDH (hydrotalcite compound). This identification was performed using the diffraction peak of the LDH (hydrotalcite compound) described in JCPDS card NO. 35-0964. Two peaks observed at 20<2θ°<25 in the XRD profile are peaks derived from polyethylene constituting the porous substrate.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: As a result of the immersion in alkali at a high temperature of 90° C. for one week, the He permeability that was 0.0 cm/min·atm in Evaluation 5 was over 10 cm/min·atm, revealing that the alkali resistance was poor.

Evaluation 8: As shown in Table 2, short circuits due to zinc dendrites occurred in less than 300 cycles, revealing that the dendrite resistance was poor.

TABLE 2

Evaluation of hydroxide ion-conductive separator

|  | LDH-like compound or composition of LDH | Composition ratio (Atomic ratio) | He permeation (cm/min · atm) | Ion conductivity (mS/cm) | Alkali resistance Presence or absence of change in He permeability | Dendrite resistance Presence or absence of short circuits |
|---|---|---|---|---|---|---|
| Example B1[#] | Mg—Ti-LDH-like | Mg:Ti = 6:94 | 0.0 | 3.0 | Absent | Absent |
| Example B2[#] | Mg—Ti-LDH-like | Mg:Ti = 20:80 | 0.0 | 2.0 | Absent | Absent |
| Example B3[#] | Mg—(Ti,Y)-LDH-like | Mg:Ti:Y = 5:83:12 | 0.0 | 3.0 | Absent | Absent |
| Example B4[#] | Mg—(Ti,Y,Al)-LDH-like | Mg:Al:Ti:Y = 7:3:79:12 | 0.0 | 3.1 | Absent | Absent |
| Example B5[#] | Mg—(Ti,Y)-LDH-like | Mg:Ti:Y = 6:88:6 | 0.0 | 3.0 | Absent | Absent |
| Example B6[#] | Mg—(Ti,Y,Al)-LDH-like | Mg:Al:Ti:Y = 5:2:67:25 | 0.0 | 3.1 | Absent | Absent |
| Example B7[#] | Mg—(Ti,Y,Al)-LDH-like | Mg:Al:Ti:Y = 15:1:47:37 | 0.0 | 2.9 | Absent | Absent |
| Example B8* | Mg—Al-LDH | Mg:Al = 67:32 | 0.0 | 2.7 | Present | Present |

Symbol [#]represents a reference example.
Symbol *represents a comparative example.

Examples C1 to C9

Examples C1 to C9 shown below are reference examples for LDH-like compound separators. The method for evaluating the LDH-like compound separators produced in the following examples was the same as in Examples B1 to B8, except that the composition ratio (atomic ratio) of Mg:Al:Ti:Y:additive element M was calculated in Evaluation 3.

Example C1 (Reference)

(1) Preparation of Polymer Porous Substrate

A commercially available polyethylene microporous membrane having a porosity of 50%, an average pore diameter of 0.1 μm, and a thickness of 20 μm was prepared as a polymer porous substrate and cut out to a size of 2.0 cm×2.0 cm.

(2) Coating of Titania. Yttria. Alumina Sol On Polymer Porous Substrate

A titanium dioxide sol solution (M6, manufactured by Taki Chemical Co., Ltd.), an yttrium sol, and an amorphous alumina solution (Al-ML15, manufactured by Taki Chemical Co. Ltd.) were mixed so that Ti/(Y+Al) (molar ratio)=2, and Y/Al (molar ratio)=8. The substrate prepared in (1) above was coated with the mixed solution by dip coating. The dip coating was carried out by dipping the substrate into 100 ml of the mixed solution, pulling up the coating substrate vertically, and allowing it to dry for 3 hours at room temperature.

(3) Preparation of Raw Material Aqueous Solution (I)

Magnesium nitrate hexahydrate ($Mg(NO_3)_2 \cdot 6H_2O$, manufactured by Kanto Chemical Co., Inc.) and urea (($NH_2)_2CO$, manufactured by Sigma-Aldrich Co. LLC) were prepared as raw materials. Magnesium nitrate hexahydrate was weighed so that it would be 0.015 mol/L and placed in a beaker, and ion-exchanged water was added therein to make a total amount of 75 ml. After stirring the obtained solution, the urea weighed at a ratio that urea/$NO_3^-$ (molar ratio)=48 was added to the solution, and the mixture was further stirred to obtain a raw material aqueous solution (I).

(4) Membrane Formation by Hydrothermal Treatment

Both the raw material aqueous solution (I) and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 120° C. for 22 hours. With an elapse of the predetermined time, the substrate was taken out from the airtight container, washed with ion-exchanged water, and dried at 70° C. for 10 hours to form an LDH-like compound inside the pores of the porous substrate.

(5) Preparation of Raw Material Aqueous Solution (II)

Indium sulfate n-hydrate ($In_2(SO_4)_3 \cdot nH_2O$, manufactured by FUJIFILM Wako Pure Chemical Corporation) was prepared as the raw material. The Indium sulfate n-hydrate was weighed so that it would be 0.0075 mol/L and placed in a beaker, to which ion-exchanged water was added to make a total volume 75 ml. The resulting solution was stirred to obtain a raw material aqueous solution (II).

(6) Addition of Indium by Immersion Treatment

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter Indium was added on the substrate by subjecting it to immersion treatment at 30° C. for 1 hour. With an elapse of the predetermined time, the substrate was taken out from the airtight container, washed with ion-exchanged water, and dried at 70° C. for 10 hours to obtain an LDH-like compound separator with Indium added thereon.

(7) Densification by Roll Pressing

The LDH-like compound separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH-like compound separator.

(8) Evaluation Result

Various evaluations were conducted on the LDH-like compound separators obtained. The results were as follows.

Figure 14:
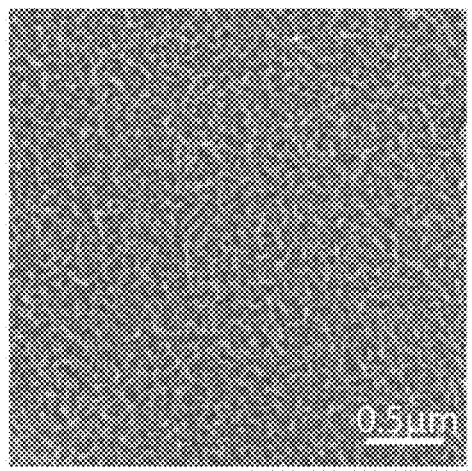
FIG. 14 is an SEM image of a surface of the LDH-like compound separator produced in Example C1.

Evaluation 1: The SEM image of surface microstructure of the LDH-like compound separator obtained in Example C1 (before having been roll pressed) was shown in FIG. 14.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Al, Ti, Y, and In were detected on the surface of the LDH-like compound separator. Moreover, the composition ratio (atomic ratio) of Al, Ti, Y, and In on the surface of the LDH-like compound separator, calculated by EDS elemental analysis was as shown in Table 3.

Evaluation 5: As shown in Table 3, the extremely high denseness was confirmed by a He permeability of 0.0 cm/min. atm.

Evaluation 6: As shown in Table 3, the high ionic conductivity was confirmed.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, the excellent dendrite resistance was confirmed in that there was no short circuit due to zinc dendrites even after 300 cycles.

Example C2 (Reference)

An LDH-like compound separator was fabricated and evaluated in the same manner as in Example C1 except that the time of immersion treatment was changed to 24 hours in indium addition by the immersion treatment of (6) above.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Al, Ti, Y, and In were detected on the surface of the LDH-like compound separator. Moreover, the composition ratio (atomic ratio) of Al, Ti, Y, and In on the surface of the LDH-like compound separator, calculated by EDS elemental analysis was as shown in Table 3.

Evaluation 5: As shown in Table 3, the extremely high denseness was confirmed by a He permeability of 0.0 cm/min atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C3 (Reference)

An LDH-like compound separator was fabricated and evaluated in the same manner as in Example C1 except that the titania-yttria sol coating was carried out as follows instead of (2) above.

(Coating of Titania-Yttria Sol on Polymer Porous Substrate)

A titanium dioxide sol solution (M6, manufactured by Taki Chemical Co., Ltd.) and an yttrium sol were mixed so that Ti/Y (molar ratio)=2. The substrate prepared in (1) above was coated with the obtained mixed solution by dip coating. The dip coating was carried out by dipping the substrate into 100 ml of the mixed solution, pulling up the coating substrate vertically, and allowing it to dry for 3 hours at room temperature.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Ti, Y, and In were detected on the surface of the LDH-like compound separator. Moreover, the composition ratio (atomic ratio) of Ti, Y, and In on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C4 (Reference)

An LDH-like compound separator was fabricated and evaluated in the same manner as in Example C1 except that the preparation of the raw material aqueous solution (II) in (5) above was carried out as follows, and bismuth was added by immersion treatment as follows instead of (6) above.

(Preparation of Raw Material Aqueous Solution (II))

Bismuth nitrate pentahydrate ($Bi(NO_3)_3 \cdot 5H_2O$) was prepared as the raw material. The bismuth nitrate pentahydrate was weighed so that it would be 0.00075 mol/L and placed in a beaker, to which ion-exchanged water was added to make a total volume 75 ml. The resulting solution was stirred to obtain a raw material aqueous solution (II).

(Addition of Bismuth by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter bismuth was added on the substrate by subjecting it to immersion treatment at 30° C. for 1 hour. With an elapse of the predetermined time, the substrate was taken out from the airtight container, washed with ion-exchanged water, and dried at 70° C. for 10 hours to obtain an LDH-like compound separator with bismuth added thereon.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Mg, Al, Ti, Y, and Bi were detected on the surface of the LDH-like compound separator. Moreover, the composition ratio (atomic ratio) of Mg, Al, Ti, Y, and Bi on the surface of the LDH-like compound separator, calculated by EDS elemental analysis was as shown in Table 3.

Evaluation 5: As shown in Table 3, the extremely high denseness was confirmed by a He permeability of 0.0 cm/min. atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C5 (Reference)

An LDH-like compound separator was fabricated and evaluated in the same manner as in Example C4 except that the time of immersion treatment was changed to 12 hours in bismuth addition by the immersion treatment described above.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Mg, Al, Ti, Y, and Bi were detected on the surface of the LDH-like compound separator. Moreover, the composition ratio (atomic ratio) of Mg, Al, Ti, Y, and Bi on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C6 (Reference)

An LDH-like compound separator was fabricated and evaluated in the same manner as in Example C4 except that the time of immersion treatment was changed to 24 hours in bismuth addition by the immersion treatment described above.

Evaluation 2: From the observation result of layered lattice stripes, the portion other than the porous substrate of the LDH-like compound separator was confirmed to be a compound having a layered crystal structure Evaluation 3: As a result of EDS elemental analysis, the constituent elements of the LDH-like compound that were Mg, Al, Ti, Y, and Bi were detected on the surface of the LDH-like compound separator. Moreover, the composition ratio (atomic ratio) of Mg, Al, Ti, Y, and Bi on the surface of the LDH-like compound separator, calculated by EDS elemental analysis was as shown in Table 3.

Evaluation 5: As shown in Table 3, the extremely high denseness was confirmed by a He permeability of 0.0 cm/min. atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C7 (Reference)

An LDH-like compound separator was fabricated and evaluated in the same manner as in Example C1 except that the preparation of the raw material aqueous solution (II) in (5) above was carried out as follows, and calcium was added by immersion treatment as follows instead of (6) above.

(Preparation of Raw Material Aqueous Solution (II))

Calcium nitrate tetrahydrate ($Ca(NO_3)_2 \cdot 4H_2O$) was prepared as the raw material. The calcium nitrate tetrahydrate was weighed so that it would be 0.015 mol/L and placed in a beaker, to which ion-exchanged water was added to make a total volume 75 ml. The resulting solution was stirred to obtain a raw material aqueous solution (II).

(Addition of Calcium by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter calcium was added on the substrate by subjecting it to immersion treatment at 30° C. for 6 hours. With an elapse of the predetermined time, the substrate was taken out from the airtight container, washed with ion-exchanged water, and dried at 70° C. for 10 hours to obtain an LDH-like compound separator with calcium added thereon.

Evaluation 2: From the observation result of layered lattice stripes, the portion other than the porous substrate of the LDH-like compound separator was confirmed to be a compound having a layered crystal structure Evaluation 3: As a result of EDS elemental analysis, the constituent elements of the LDH-like compound that were Mg, Al, Ti, Y, and Ca were detected on the surface of the LDH-like compound separator. Moreover, the composition ratio (atomic ratio) of Mg, Al, Ti, Y, and Ca on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C8 (Reference)

An LDH-like compound separator was fabricated and evaluated in the same manner as in Example C1 except that the preparation of the raw material aqueous solution (II) in (5) above was carried out as follows, and strontium was added by immersion treatment as follows instead of (6) above.

(Preparation of Raw Material Aqueous Solution (II))

Strontium nitrate ($Sr(NO_3)_2$) was prepared as the raw material. The strontium nitrate was weighed so that it would be 0.015 mol/L and placed in a beaker, to which ion-exchanged water was added to make a total volume 75 ml. The resulting solution was stirred to obtain a raw material aqueous solution (II).

(Addition of Strontium by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter strontium was added on the substrate by subjecting it to immersion treatment at 30° C. for 6 hours. With an elapse of the predetermined time, the substrate was taken out from the airtight container, washed with ion-exchanged water, and dried at 70° C. for 10 hours to obtain an LDH-like compound separator with strontium added thereon.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Mg, Al, Ti, Y, and Sr were detected on the surface of the LDH-like compound separator. Moreover, the composition ratio (atomic ratio) of Mg, Al, Ti, Y, and Sr on the surface of the LDH-like compound separator, calculated by EDS elemental analysis was as shown in Table 3.

Evaluation 5: As shown in Table 3, the extremely high denseness was confirmed by a He permeability of 0.0 cm/min atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C9 (Reference)

An LDH-like compound separator was fabricated and evaluated in the same manner as in Example C1 except that the preparation of the raw material aqueous solution (II) in (5) above was carried out as follows, and barium was added by immersion treatment as follows instead of (6) above.

(Preparation of Raw Material Aqueous Solution (II))

Barium nitrate ($Ba(NO_3)_2$) was prepared as the raw material. The barium nitrate was weighed so that it would be 0.015 mol/L and placed in a beaker, to which ion-exchanged water was added to make a total volume 75 ml. The resulting solution was stirred to obtain a raw material aqueous solution (II).

(Addition of Barium by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter barium was added on the substrate by subjecting it to immersion treatment at 30° C. for 6 hours. With an elapse of the predetermined time, the substrate was taken out from the airtight container, washed with ion-exchanged water, and dried at 70° C. for 10 hours to obtain an LDH-like compound separator with barium added thereon.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Al, Ti, Y, and Ba were detected on the surface of the LDH-like compound separator. Moreover, the composition ratio (atomic ratio) of Al, Ti, Y, and Ba on the surface of the LDH-like compound separator, calculated by EDS elemental analysis was as shown in Table 3.

Evaluation 5: As shown in Table 3, the extremely high denseness was confirmed by a He permeability of 0.0 cm/min atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

TABLE 3

| | LDH-like compound or LDH composition | Composition ratio (atomic ratio relative to 100 of the total amount of Mg + Al + Ti + Y + M) | M/(Mg + Al + Ti + Y + M) | He permeability (cm/min · atm) | Ion conductivity (mS/cm) | Evaluation of hydroxide ion-conductive separator | |
|---|---|---|---|---|---|---|---|
| | | | | | | Alkali resistance Presence or absence of change in He permeability | Dendrite resistance Presence or absence of short circuit |
| Example C1# | Al,Ti,Y,In-LDH-like | Mg: 0, Al: 2, Ti: 78, Y: 8, In: 12 | 0.12 (M = In) | 0.0 | 3.1 | Absent | Absent |
| Example C2# | Al,Ti,Y,In-LDH-like | Mg: 0, Al: 1, Ti: 56, Y: 11, In: 32 | 0.32 (M = In) | 0.0 | 3.1 | Absent | Absent |
| Example C3# | Ti,Y,In-LDH-like | Mg: 0, Al: 0, Ti: 78, Y: 8, In: 14 | 0.14 (M = In) | 0.0 | 3.0 | Absent | Absent |
| Example C4# | Mg,Al,Ti,Y,Bi-LDH-like | Mg: 2, Al: 2, Ti: 81, Y: 12, Bi: 3 | 0.03 (M = Bi) | 0.0 | 2.9 | Absent | Absent |
| Example C5# | Mg,Al,Ti,Y,Bi-LDH-like | Mg: 2, Al: 2, Ti: 72, Y: 10, Bi: 14 | 0.14 (M = Bi) | 0.0 | 2.8 | Absent | Absent |
| Example C6# | Mg,Al,Ti,Y,Bi-LDH-like | Mg: 1, Al: 1, Ti: 66, Y: 7, Bi: 25 | 0.25 (M = Bi) | 0.0 | 2.8 | Absent | Absent |
| Example C7# | Mg,Al,Ti,Y,Ca-LDH-like | Mg: 1, Al: 3, Ti: 73, Y: 15, Ca: 8 | 0.08 (M = Ca) | 0.0 | 2.8 | Absent | Absent |
| Example C8# | Mg,Al,Ti,Y,Sr-LDH-like | Mg: 1, Al: 3, Ti: 74, Y: 14, Sr: 8 | 0.08 (M = Sr) | 0.0 | 3.0 | Absent | Absent |
| Example C9# | Al,Ti,Y,Ba-LDH-like | Mg: 0, Al: 4, Ti: 71, Y: 14, Ba: 11 | 0.11 (M = Ba) | 0.0 | 2.8 | Absent | Absent |
| Example B8* | Mg,Al-LDH | Mg: 68 Al: 32 | 0 | 0.0 | 2.7 | Present | Present |

Symbol #represents a reference example.
Symbol *represents a comparative example.

Examples D1 and D2

Examples D1 and D2 shown below are reference examples for LDH-like compound separators. The method for evaluating the LDH-like compound separators produced in the following examples was the same as in Examples B1 to B8, except that the composition ratio (atomic ratio) of Mg:Al:Ti:Y:In was calculated in Evaluation 3.

Example D1 (Reference)

(1) Preparation of Polymer Porous Substrate

A commercially available polyethylene microporous membrane having a porosity of 50%, an average pore diameter of 0.1 μm, and a thickness of 20 μm was prepared as a polymer porous substrate and cut out to a size of 2.0 cm×2.0 cm.

(2) Coating of Titania Yttria. Alumina Sol on Polymer Porous Substrate

A titanium dioxide sol solution (M6, manufactured by Taki Chemical Co., Ltd.), an yttrium sol, and an amorphous alumina solution (Al-ML15, manufactured by Taki Chemical Co. Ltd.) were mixed so that Ti/(Y+Al) (molar ratio)=2, and Y/Al (molar ratio)=8. The substrate prepared in (1) above was coated with the mixed solution by dip coating. The dip coating was carried out by dipping the substrate into 100 ml of the mixed solution, pulling up the coating substrate vertically, and allowing it to dry for 3 hours at room temperature.

(3) Preparation of Raw Material Aqueous Solution

As the raw materials, magnesium nitrate hexahydrate ($Mg(NO_3)_2 \cdot 6H_2O$, manufactured by Kanto Chemical Co., Inc.), indium sulfate n-hydrate ($In(SO_4)_3 \cdot nH_2O$, manufactured by FUJIFILM Wako Pure Chemicals Corporation), and urea (($NH_2)_2CO$, manufactured by Sigma-Aldrich Co. LLC) were prepared. Magnesium nitrate hexahydrate, indium sulfate n-hydrate, and the urea were weighed so as to adjust the concentrations thereof to 0.0075 mol/L, 0.0075 mol/L, and 1.44 mol/L, respectively and placed in a beaker, to which ion-exchanged water was added to make a total volume 75 ml. The resulting solution was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 120° C. for 22 hours. With an elapse of the predetermined time, the substrate was taken out from the airtight container, washed with ion-exchanged water, and dried at 70° C. for 10 hours to allow for forming of a functional layer including an LDH-like compound and $In(OH)_3$ inside pores of the porous substrates. Thus, an LDH-like compound separator was obtained.

(5) Densification by Roll Pressing

The LDH-like compound separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH-like compound separator.

(6) Evaluation Result

Figure 15:
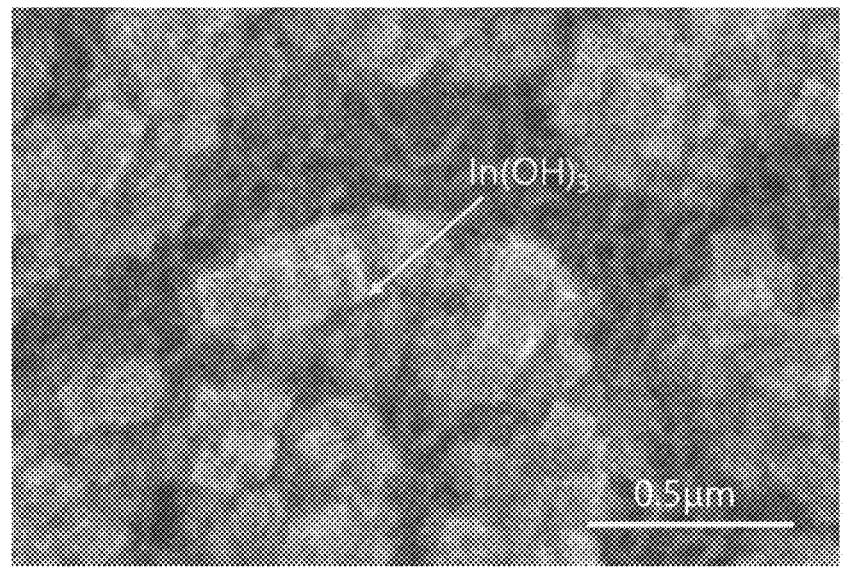
FIG. 15 is an SEM image of a surface of the LDH-like compound separator produced in Example D1.

Evaluations 1 to 8 were conducted for the LDH-like compound separators obtained. The results were as follows.
Evaluation 1: The SEM image of surface microstructure of the LDH-like compound separator obtained in Example D1 (before having been roll pressed) was shown in FIG. 15. As shown in FIG. 15, cubic crystals were confirmed to be observed on the surface of the LDH-like compound separator. The results of EDS elemental analysis and X-ray diffraction measurement described below demonstrate that these cubic crystals are presumed to be $In(OH)_3$.

Evaluation 2: From the observation result of layered lattice stripes, the LDH-like compound separator was confirmed to include a compound with a layered crystal structure.

Evaluation 3: As a result of EDS elemental analysis, the constituent elements of the LDH-like compound or $In(OH)_3$, which were Mg, Al, Ti, Y, and In were detected on the surface of the LDH-like compound separator. Moreover, in the cubic crystals present on the surface of the LDH-like compound separator, In that was a constituent element of $In(OH)_3$, was detected. The composition ratio (atomic ratio) of Mg, Al, Ti, Y, and In on the surface of the LDH-like compound separator, calculated by EDS elemental analysis is as shown in Table 4.

Evaluation 4: The peaks in the XRD profile obtained identified that $In(OH)_3$ was present in the LDH-like compound separator. This identification was conducted using the diffraction peaks of $In(OH)_3$ listed in JCPDS card No. 01-085-1338.

Evaluation 5: As shown in Table 4, the extremely high denseness was confirmed by a He permeability of 0.0 cm/min·atm.

Evaluation 6: As shown in Table 4, the high ionic conductivity was confirmed.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 4, the excellent dendrite resistance was confirmed in that there was no short circuit due to zinc dendrites even after 300 cycles.

Example D2 (Reference)

An LDH-like compound separator was fabricated and evaluated in the same manner as in Example D1 except that the titania-yttria sol coating was carried out as follows instead of (2) above.

(Coating of Titania-Yttria Sol on Polymer Porous Substrate)

A titanium dioxide sol solution (M6, manufactured by Taki Chemical Co., Ltd.) and an yttrium sol were mixed so that Ti/Y (molar ratio)=2. The substrate prepared in (1) above was coated with the obtained mixed solution by dip coating. The dip coating was carried out by dipping the substrate into 100 ml of the mixed solution, pulling up the coating substrate vertically, and allowing it to dry for 3 hours at room temperature.

Figure 16:
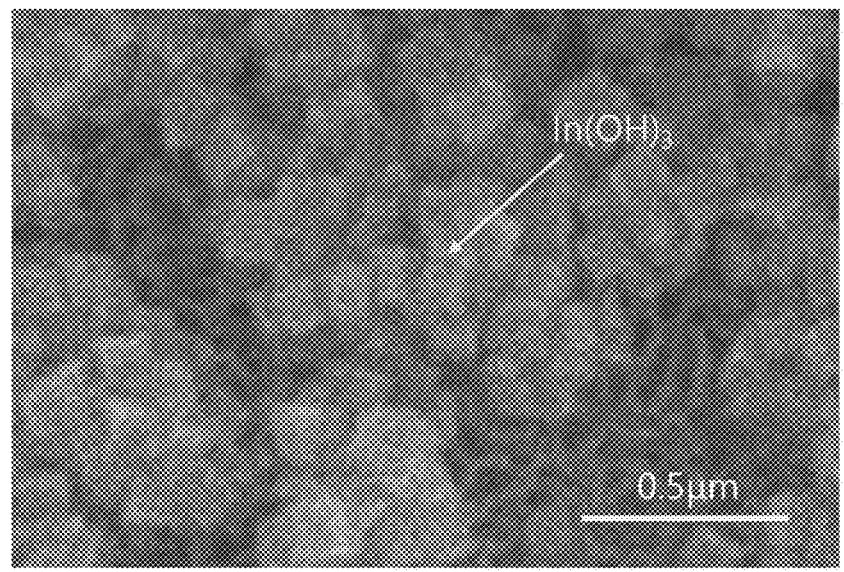
FIG. 16 is an SEM image of a surface of the LDH-like compound separator produced in Example D2.

Evaluation 1: The SEM image of surface microstructure of the LDH-like compound separator obtained in Example D2 (before being roll pressed) is as shown in FIG. 16. As shown in FIG. 16, cubic crystals were confirmed to be observed on the surface of the LDH-like compound separator. The results of EDS elemental analysis and X-ray diffraction measurement described below demonstrate that these cubic crystals are presumed to be $In(OH)_3$.

Evaluation 2: From the observation result of layered lattice stripes, the LDH-like compound separator was confirmed to include a compound having a layered crystal structure.

Evaluation 3: As a result of EDS elemental analysis, the constituent elements of the LDH-like compound or $In(OH)_3$, which were Mg, Ti, Y, and In were detected on the surface of the LDH-like compound separator. Moreover, in the cubic crystals on the surface of the LDH-like compound separator, In that is a constituent element of $In(OH)_3$, was detected. The composition ratio (atomic ratio) of Mg, Ti, Y, and In on the surface of the LDH-like compound separator, calculated by EDS elemental analysis is as shown in Table 4.

Evaluation 4: The peaks in the XRD profile obtained identified that $In(OH)_3$ was present in the LDH-like compound separator. This identification was conducted using the diffraction peaks of $In(OH)_3$ listed in JCPDS card No. 01-085-1338.

Evaluation 5: As shown in Table 4, the extremely high denseness was confirmed by a He permeability of 0.0 cm/min atm.

Evaluation 6: The high ionic conductivity was confirmed, as shown in Table 4.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 4, no short circuit caused by zinc dendrite occurred even after 300 cycles, confirming the excellent dendrite resistance.

TABLE 4

| | Constitution of functional layer | Composition (atomic ratio relative to 100 of total amount of Mg + Al + Ti + Y + In) | In/(Mg + Al + Ti + Y + In) | He permeability (cm/min · atm) | Ion conductivity (mS/cm) | Evaluation of hydroxide ion-conductive separator Alkali resistance Presence or absence of change in He permeability | Dendrite resistance Presence or absence of short circuit |
|---|---|---|---|---|---|---|---|
| Example D1# | LDH-like + $In(OH)_3$ | Mg: 7, Al: 1, Ti: 24, Y: 3, In: 65 | 0.65 | 0.0 | 2.7 | Absent | Absent |
| Example D2# | LDH-like + $In(OH)_3$ | Mg: 6, Al: 0, Ti: 17, Y: 3, In: 74 | 0.74 | 0.0 | 2.8 | Absent | Absent |
| Example B8* | LDH | Mg: 68, Al: 32 | 0 | 0.0 | 2.7 | Present | Present |

Symbol# represents a reference example.

Symbol* represents a comparative example.

What is claimed is:

1. An LDH-like compound separator comprising a porous substrate made of a polymeric material; and a layered double hydroxide (LDH)-like compound with which pores of the porous substrate are plugged,
wherein a central region along the thickness of the LDH-like compound separator has a lower mean porosity than peripheral regions along the thickness of the LDH-like compound separator.

2. The LDH-like compound separator according to claim 1, wherein the LDH-like compound is:
(a) a hydroxide and/or an oxide with a layered crystal structure, containing: Mg; and one or more elements, which include at least Ti, selected from the group consisting of Ti, Y, and Al, or
(b) a hydroxide and/or an oxide with a layered crystal structure, comprising (i) Ti, Y, and optionally Al and/or Mg, and (ii) at least one additive element M selected from the group consisting of In, Bi, Ca, Sr, and Ba, or
(c) a hydroxide and/or an oxide with a layered crystal structure, comprising Mg, Ti, Y, and optionally Al and/or In, wherein in (c) the LDH-like compound is present in a form of a mixture with $In(OH)_3$.

3. The LDH-like compound separator according to claim 1, wherein the peripheral regions have a mean porosity of 3% or more and the central region has a mean porosity of 2% or less.

4. The LDH-like compound separator according to claim 1, wherein the peripheral regions have a mean porosity of 3 to 15% and the central region has a mean porosity of 1%) or less.

5. The LDH-like compound separator according to claim 1, wherein the LDH-like compound is incorporated over the entire thickness of the porous substrate.

6. The LDH-like compound separator according to claim 1, having a helium permeability per unit area of 3.0 cm/atm m in or less.

7. The LDH-like compound separator according to claim 1, having an ionic conductivity of 2.0 mS/cm or more.

8. The LDH-like compound separator according to claim 1, wherein the polymeric material is selected from the group consisting of polystyrene, poly(ether sulfone), polypropylene, epoxy resin, poly(phenylene sulfide), fluorocarbon resin, cellulose, nylon, and polyethylene.

9. The LDH-like compound separator according to claim 1, consisting of the porous substrate and the LDH-like compound.

10. A secondary zinc battery comprising the LDH-like compound separator according to claim 1.

11. A solid-state alkaline fuel cell comprising the LDH-like compound separator according to claim 1.

* * * * *